US012452521B2

(12) United States Patent
Mahar et al.

(10) Patent No.: US 12,452,521 B2
(45) Date of Patent: Oct. 21, 2025

(54) PROVIDING A TEMPLATE FOR MEDIA CONTENT GENERATION

(71) Applicant: Snap Inc., Santa Monica, CA (US)

(72) Inventors: Matthew Mahar, San Francisco, CA (US); Vineet Kapil, Santa Monica, CA (US); Kaveh Anvaripour, Santa Monica, CA (US); Ranidu Lankage, Belmont, CA (US); Anton Shevchenko, Black Diamond, WA (US); Xin Su, Santa Clara, CA (US); Benjamin Lin, Manhattan, NY (US); Noam Lerner, Los Angeles, CA (US); Rasana Manandhar, Draper, UT (US); Prasad Tare, Flushing, NY (US); Dustin Kendall, Highland, UT (US)

(73) Assignee: Snap Inc., Santa Monica, CA (US)

( * ) Notice: Subject to any disclaimer, the term of this patent is extended or adjusted under 35 U.S.C. 154(b) by 175 days.

(21) Appl. No.: 18/362,644

(22) Filed: Jul. 31, 2023

(65) Prior Publication Data

US 2025/0047969 A1 Feb. 6, 2025

(51) Int. Cl.
*H04N 23/63* (2023.01)
*G06F 3/0482* (2013.01)

(52) U.S. Cl.
CPC ......... *H04N 23/631* (2023.01); *G06F 3/0482* (2013.01); *H04N 23/633* (2023.01)

(58) Field of Classification Search
CPC .. H04N 23/631; H04N 23/633; G06F 3/0482; G11B 27/031; G11B 27/02
See application file for complete search history.

(56) References Cited

U.S. PATENT DOCUMENTS 9,355,499 B1 5/2016 Johnson
2010/0223128 A1 9/2010 Dukellis et al.
(Continued)

FOREIGN PATENT DOCUMENTS

WO 2007082167 7/2007

OTHER PUBLICATIONS

"International Application Serial No. PCT US2024 040179, International Search Report mailed Nov. 5, 2024", 3 pgs.
(Continued)

*Primary Examiner* — Kelly L Jerabek
(74) *Attorney, Agent, or Firm* — Schwegman Lundberg & Woessner, P.A.

(57) ABSTRACT

Aspects of the present disclosure involve a system comprising a storage medium storing a program and method for providing a template for media content generation. The program and method provide for receiving, from a first device of a first user, an indication of first user input setting properties to create a template for combining user-selected media with an audio track, the properties specifying the audio track, a sequence of media slots, a duration for each media slot, and predefined edits for applying to the media slots; causing display of a user interface on a second device of a second user, the user interface for assigning a respective video or photo to each media slot; and receiving, from the second device, a media content item generated based on second user input provided via the user interface, the second user input assigning the respective video or photo to each media slot.

16 Claims, 13 Drawing Sheets

(56) References Cited

U.S. PATENT DOCUMENTS

2016/0105388 A1* 4/2016 Bin Mahfooz ..... G06F 3/04817
709/206
2022/0103780 A1* 3/2022 Doty ..................... H04N 23/63
2022/0206738 A1* 6/2022 Anvaripour .......... G11B 27/031
2022/0207838 A1* 6/2022 Anvaripour .......... H04N 23/667
2023/0144094 A1 5/2023 Wu et al.

OTHER PUBLICATIONS

"International Application Serial No. PCT US2024 040179, Written Opinion mailed Nov. 5, 2024", 5 pgs.

* cited by examiner

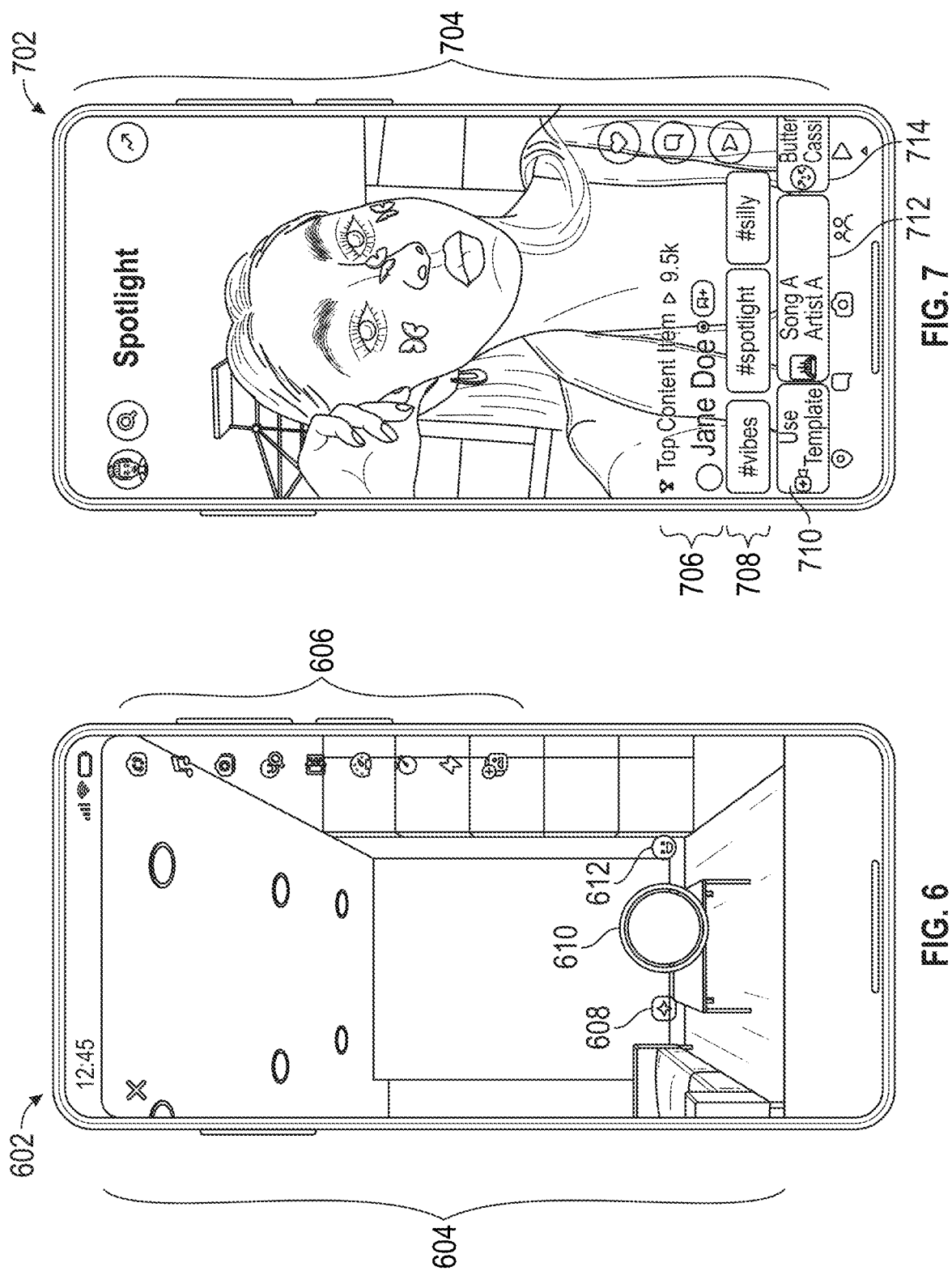

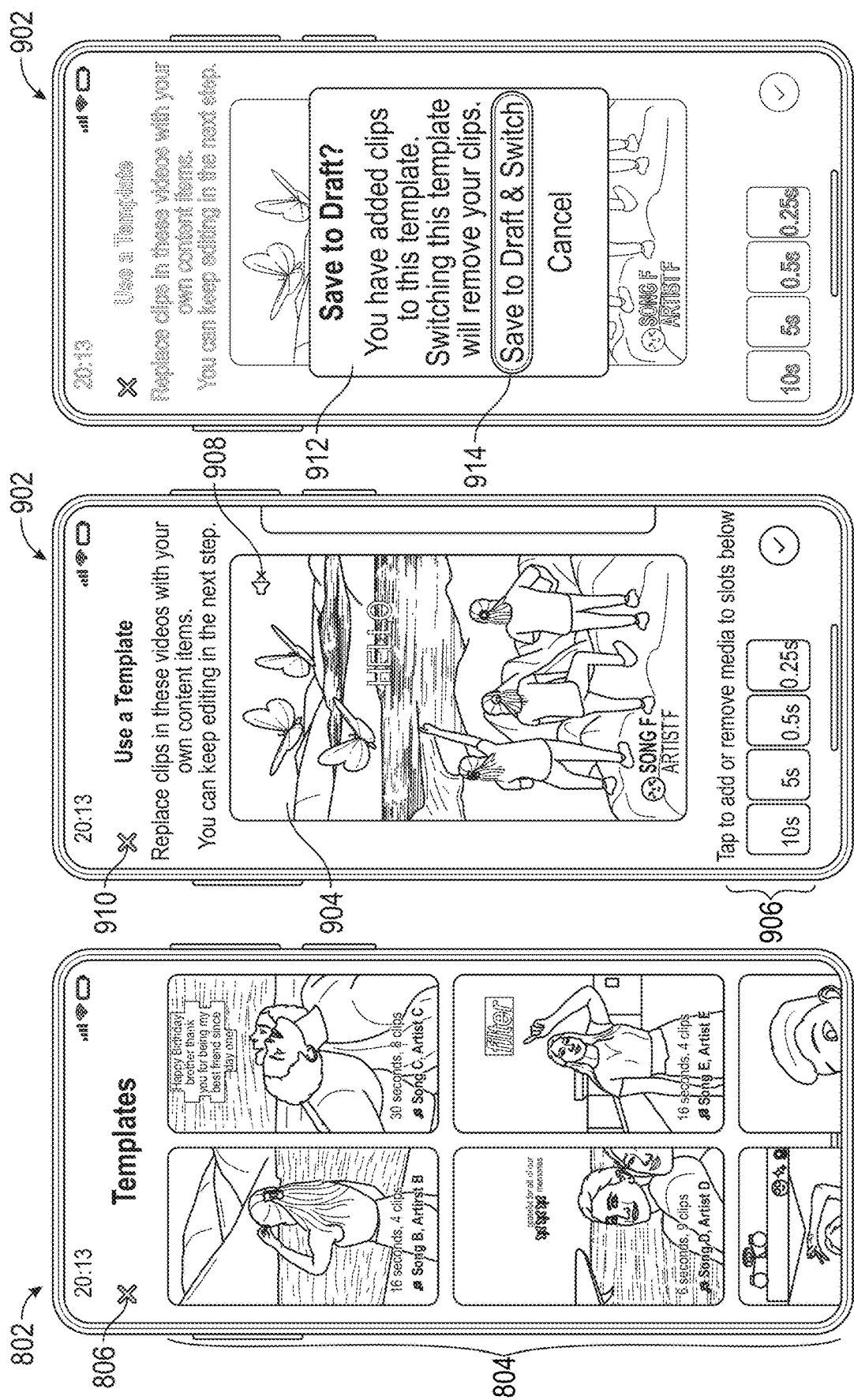

PROVIDING A TEMPLATE FOR MEDIA CONTENT GENERATION

BACKGROUND

Systems such as messaging systems provide for the exchange of message content between users. For example, such systems allow users to exchange message content (e.g., text, video, pictures) between each other.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIG. 6 illustrates a user interface corresponding to a camera interface including a first entry point for a template, in accordance with some examples.

FIG. 7 illustrates a user interface corresponding to a media content item including a second entry point for a template, in accordance with some examples.

FIG. 8 illustrates a user interface corresponding to a template grid view, in accordance with some examples.

FIGS. 9A-9B illustrate a user interface corresponding to a template selection view, in accordance with some examples.

DETAILED DESCRIPTION

Systems such as messaging systems typically allow users to exchange media content items (e.g., messages, images and/or video) with one another. As described herein, the system provides for a user to capture video, and for the user to customize interface elements that are displayed during video recording.

The disclosed embodiments relate to a system that provides for a first user (e.g., a template creator) to create a template for combining an audio track with media content that is subsequently selected by a second user (e.g., an end user). The first user specifies the preset audio track, defines media slots for subsequent user selection of videos/photos to accompany the audio track, and defines edits (e.g., captions, stickers, augmented reality content items) for applying to the subsequently-selected videos/photos.

The system makes the template available to end users. When the second user selects to use the template, the system provides a user interface to the second user, for selecting the videos/photos for assigning to the media slots, and for selecting any additional edits (e.g., if permitted by the template). The system generates the media content item based on the properties and edits of the template, as well as on the selections by the second user.

By virtue of the foregoing, the system provides for increased user engagement with respect to generating and/or sharing media content items. For example, the system facilitates the creation of media content items by employing templates with preset audio track(s) and media slots to accompany the audio tracks. Thus, the system facilitates the creation of media content items for sharing between contacts, thereby saving time for end users, and reducing computational resources/processing power.

Networked Computing Environment

Figure 1:
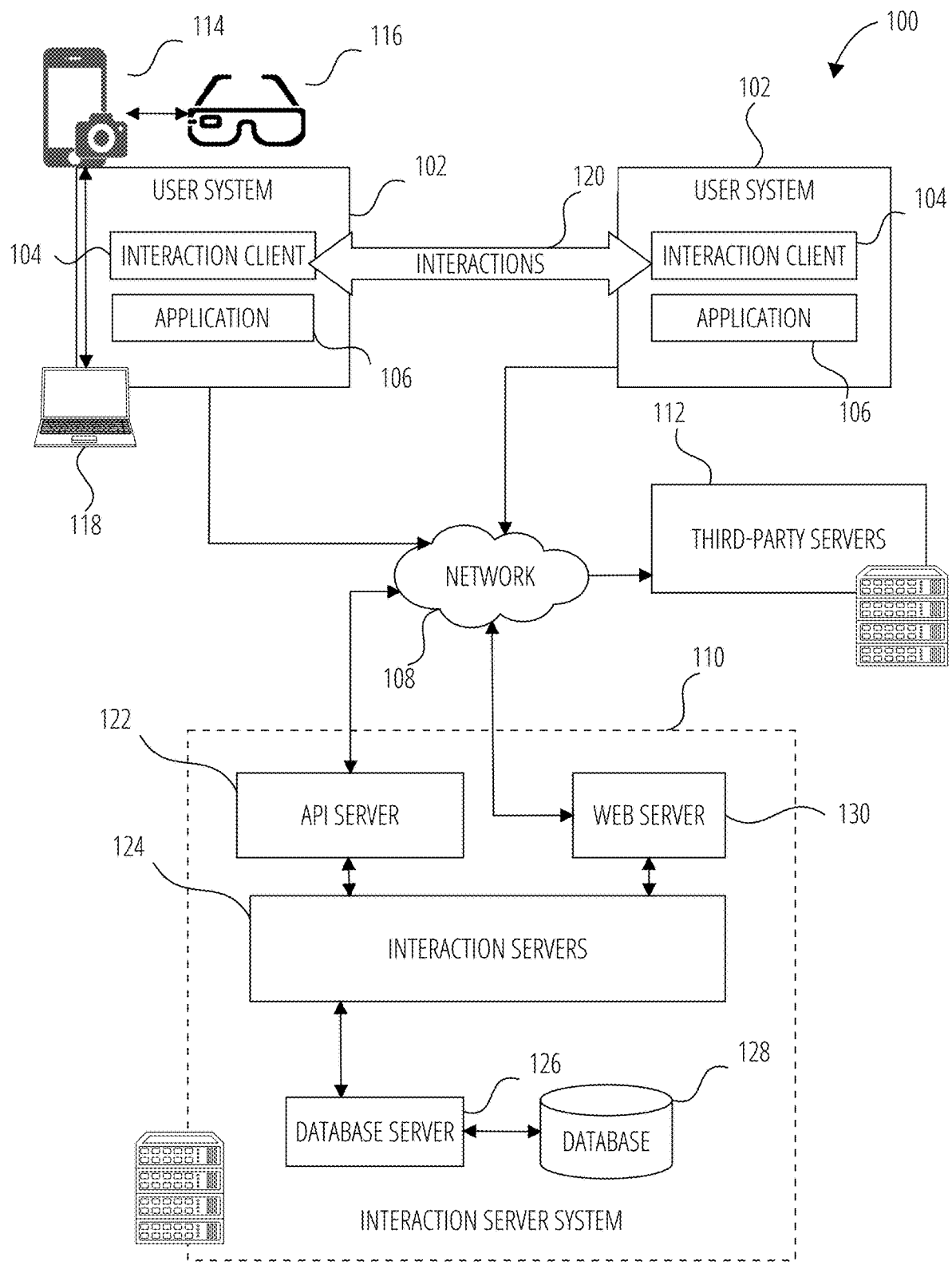
FIG. 1 is a diagrammatic representation of a networked environment in which the present disclosure may be deployed, according to some examples.

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the user systems 102 (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph (e.g., the entity graph 304); the location of friends within an entity relationship graph; and opening an application event (e.g., relating to the interaction client 104).

The interaction servers 124 host multiple systems and subsystems, described below with reference to FIG. 2.

System Architecture

Figure 2:
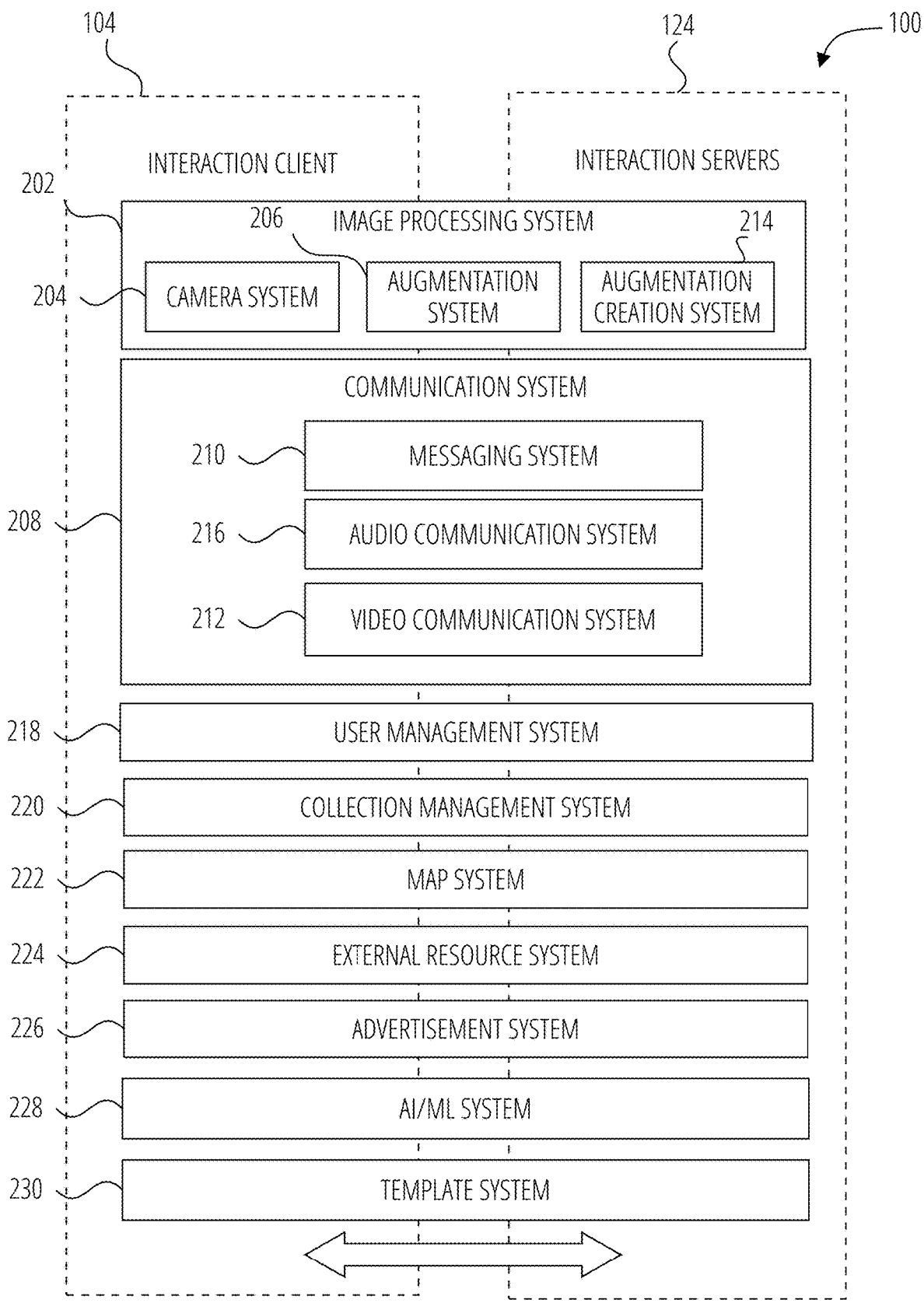
FIG. 2 is a diagrammatic representation of a messaging system that has both client-side and server-side functionality, according to some examples.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. In some examples, these subsystems are implemented as microservices. A microservice subsystem (e.g., a microservice application) may have components that enable it to operate independently and communicate with other services. Example components of microservice subsystem may include:

Function logic: The function logic implements the functionality of the microservice subsystem, representing a specific capability or function that the microservice provides.

API interface: Microservices may communicate with each other components through well-defined APIs or interfaces, using lightweight protocols such as REST or messaging. The API interface defines the inputs and outputs of the microservice subsystem and how it interacts with other microservice subsystems of the interaction system 100.

Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.

Service discovery: Microservice subsystems may find and communicate with other microservice subsystems of the interaction system 100. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture:

Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory of a user system 102. These augmentations are selected by the augmentation system 206 and presented to a user of an interaction client 104, based on a number of inputs and data, such as for example:

Geolocation of the user system 102; and

Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system) that, based on duration and display parameters associated with a message or collection of messages (e.g., a story), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 218 is operationally responsible for the management of user data and profiles, and maintains entity information (e.g., stored in entity tables 308, entity graphs 304 and profile data 302) regarding users and relationships between users of the interaction system 100.

A collection management system 220 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 220 may also be responsible for publishing an icon that provides notification of a particular collection to the user interface of the interaction client 104. The collection management system 220 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

A map system 222 provides various geographic location (e.g., geolocation) functions and supports the presentation of map-based media content and messages by the interaction client 104. For example, the map system 222 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

An external resource system 224 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 226 operationally enables the purchasing of advertisements by third parties for presentation to end-users via the interaction clients 104 and also handles the delivery and presentation of these advertisements.

An artificial intelligence and machine learning system 228 provides a variety of services to different subsystems within the interaction system 100. For example, the artificial intelligence and machine learning system 228 operates with the image processing system 202 and the camera system 204 to analyze images and extract information such as objects, text, or faces. This information can then be used by the image processing system 202 to enhance, filter, or manipulate images. The artificial intelligence and machine learning system 228 may be used by the augmentation system 206 to generate augmented content and augmented reality experiences, such as adding virtual objects or animations to real-world images. The communication system 208 and messaging system 210 may use the artificial intelligence and machine learning system 228 to analyze communication patterns and provide insights into how users interact with each other and provide intelligent message classification and tagging, such as categorizing messages based on sentiment or topic. The artificial intelligence and machine learning system 228 may also provide chatbot functionality to message interactions 120 between user systems 102 and between a user system 102 and the interaction server system 110. The artificial intelligence and machine learning system 228 may also work with the audio communication system 216 to provide speech recognition and natural language processing capabilities, allowing users to interact with the interaction system 100 using voice commands.

A template system 230 provides for the creation and use of templates for generating media content items. As described herein, a template is usable by an end user to combine a preset audio track with user-selected media content. In example embodiments, the template system 230 provides for a first user (e.g., a template creator) to create a template. The first user specifies the preset audio track, defines media slots for subsequent user selection of videos/photos to accompany the audio track, and defines corresponding edits (e.g., captions, stickers, augmented reality content items). The template system 230 provides a user interface to a second user (e.g., an end user), who selects the videos/photos for assigning to the media slots, and selects any additional edits (e.g., if permitted by the template). The template system 230 is configured to generate the media content item based on the properties and edits of the template, as well as on the selections by the second user.

Data Architecture

Figure 3:
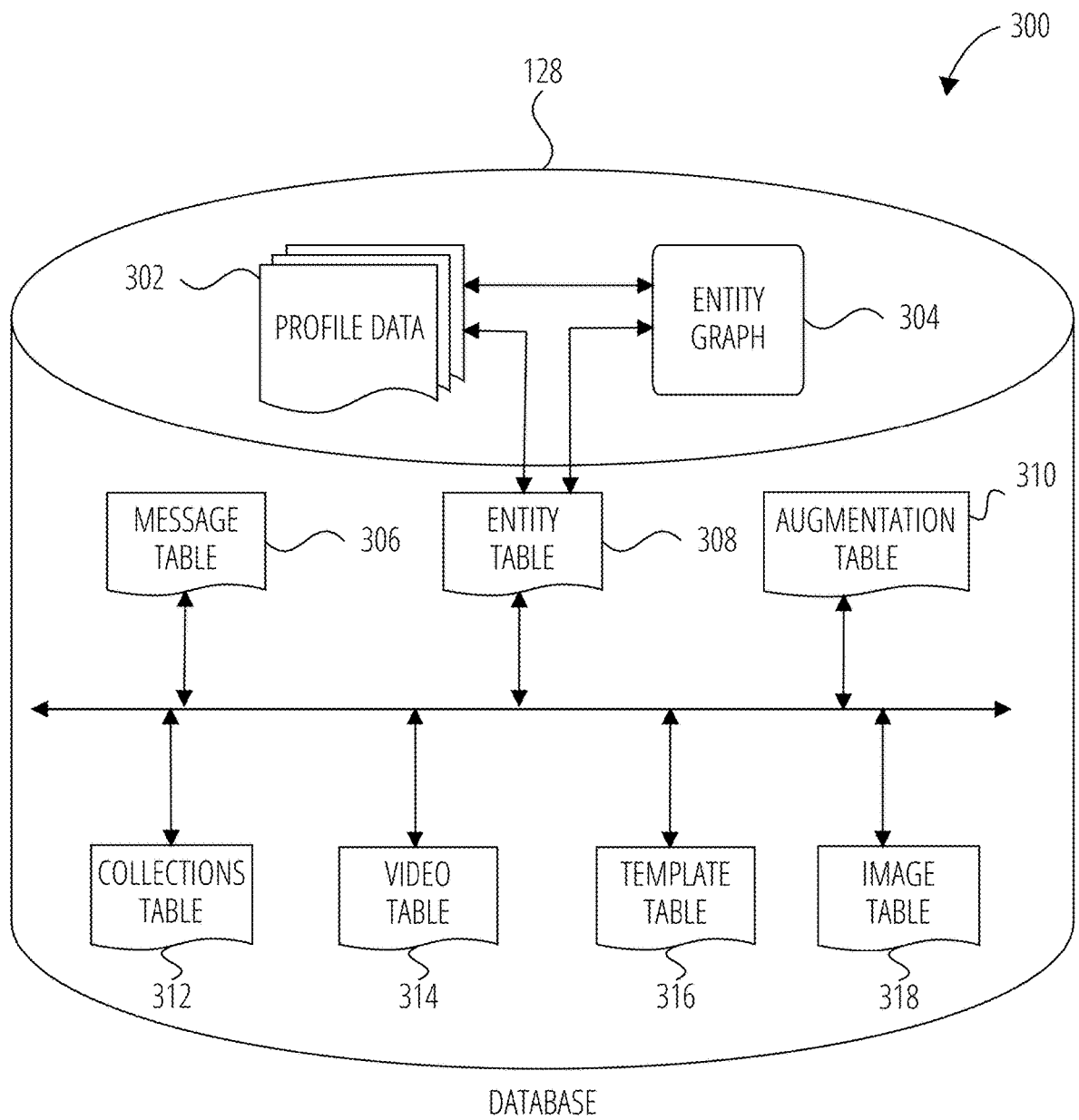
FIG. 3 is a diagrammatic representation of a data structure as maintained in a database, according to some examples.

FIG. 3 is a schematic diagram illustrating data structures 300, which may be stored in the database 128 of the interaction server system 110, according to certain examples. While the content of the database 128 is shown to comprise multiple tables, it will be appreciated that the data could be stored in other types of data structures (e.g., as an object-oriented database).

The database 128 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 3.

An entity table 308 stores entity data, and is linked (e.g., referentially) to an entity graph 304 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 304 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 128 also stores augmentation data, such as overlays or filters, in an augmentation table 310. The augmentation data is associated with and applied to videos (for which data is stored in a video table 314) and images (for which data is stored in an image table 318).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 318 includes augmented reality content items (e.g., corresponding to applying "lenses" or augmented reality experiences). An augmented reality content item may be a real-time special effect and sound that may be added to an image or a video.

A collections table 312 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 318 stores image data associated with messages for which message data is stored in the entity table 308. The entity table 308 may associate various augmentations from the augmentation table 310 with various images and videos stored in the image table 318 and the video table 314.

The databases 128 also includes a template table 316, which stores available templates (e.g., as created by template creators). As described herein, a template is usable to combine audio track(s) with user-selected videos/photos based on media slots defined by the template. Each media slot has a preset duration (e.g., that is synchronized with the beat of the audio track). In example embodiments, a template has predefined edits (e.g., captions, stickers, augmented reality content items) for applying to the selected videos/photos. A media content item can be generated based on the properties and edits of a given template, as well as on the selections (e.g., videos/photos, additional edits) by an end user.

Data Communications Architecture

Figure 4:
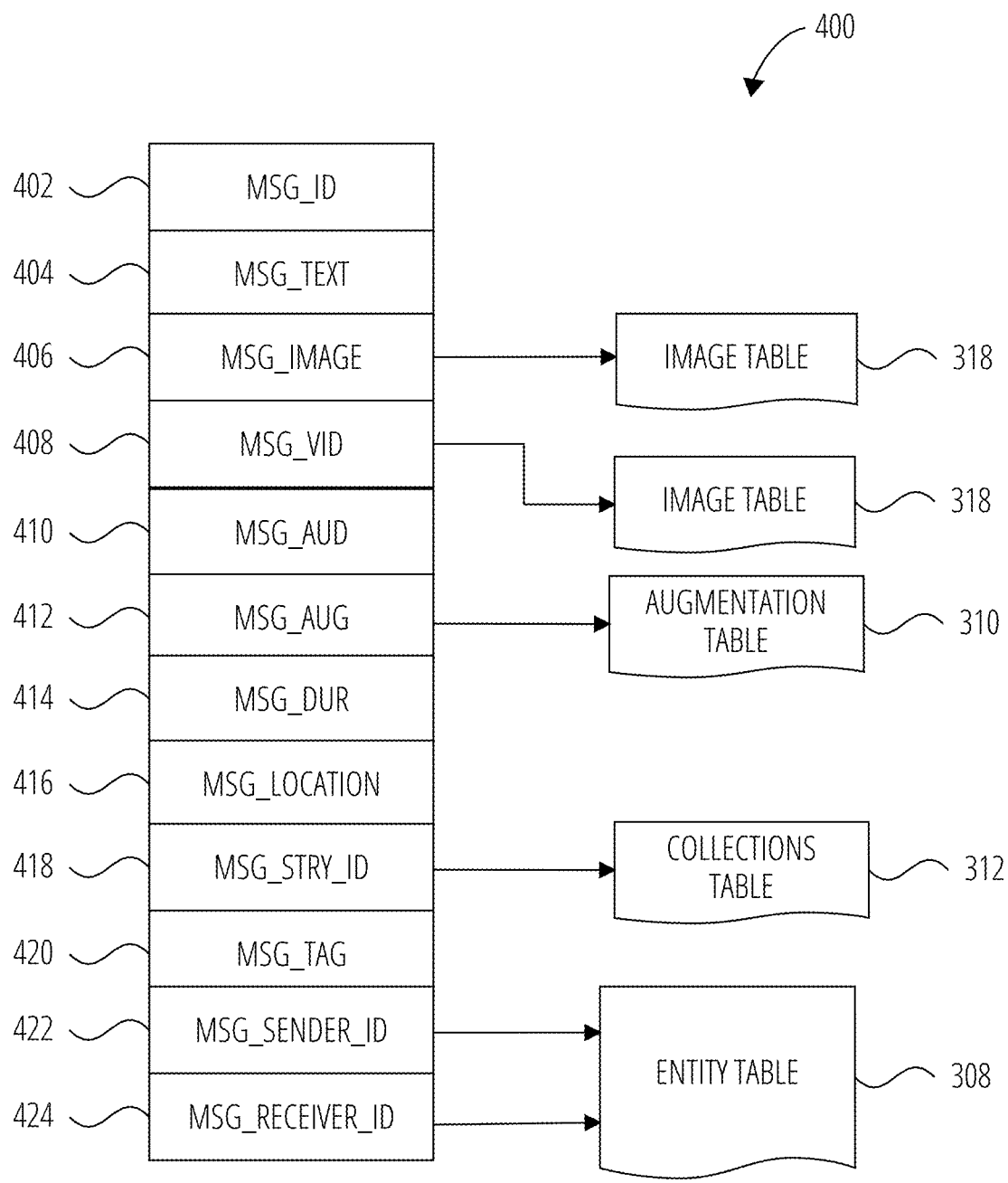
FIG. 4 is a diagrammatic representation of a message, according to some examples.

FIG. 4 is a schematic diagram illustrating a structure of a message 400, according to some examples, generated by an interaction client 104 for communication to a further interaction client 104 via the interaction servers 124. The content of a particular message 400 is used to populate the message table 306 stored within the database 128, accessible by the interaction servers 124. Similarly, the content of a message 400 is stored in memory as "in-transit" or "in-flight" data of the user system 102 or the interaction servers 124. A message 400 is shown to include the following example components:

Message identifier 402: a unique identifier that identifies the message 400.

Message text payload 404: text, to be generated by a user via a user interface of the user system 102, and that is included in the message 400.

Message image payload 406: image data, captured by a camera component of a user system 102 or retrieved from a memory component of a user system 102, and that is included in the message 400. Image data for a sent or received message 400 may be stored in the image table 318.

Message video payload 408: video data, captured by a camera component or retrieved from a memory component of the user system 102, and that is included in the message 400. Video data for a sent or received message 400 may be stored in the image table 318.

Message audio payload 410: audio data, captured by a microphone or retrieved from a memory component of the user system 102, and that is included in the message 400.

Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

Message duration parameter 414: parameter value indicating, in seconds, the amount of time for which content of the message (e.g., the message image payload 406, message video payload 408, message audio payload 410) is to be presented or made accessible to a user via the interaction client 104.

Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

Message story identifier 418: identifier values identifying one or more content collections (e.g., "stories" identified in the collections table 312) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the user system 102 on which the message 400 was generated and from which the message 400 was sent.

Message receiver identifier 424: an identifier (e.g., a messaging system identifier, email address, or device identifier) indicative of a user of the user system 102 to which the message 400 is addressed.

The contents (e.g., values) of the various components of message 400 may be pointers to locations in tables within which content data values are stored. For example, an image value in the message image payload 406 may be a pointer to (or address of) a location within an image table 318. Similarly, values within the message video payload 408 may point to data stored within an image table 318, values stored within the message augmentation data 412 may point to data stored in an augmentation table 310, values stored within the message story identifier 418 may point to data stored in a collections table 312, and values stored within the message sender identifier 422 and the message receiver identifier 424 may point to user records stored within an entity table 308.

Figure 5:
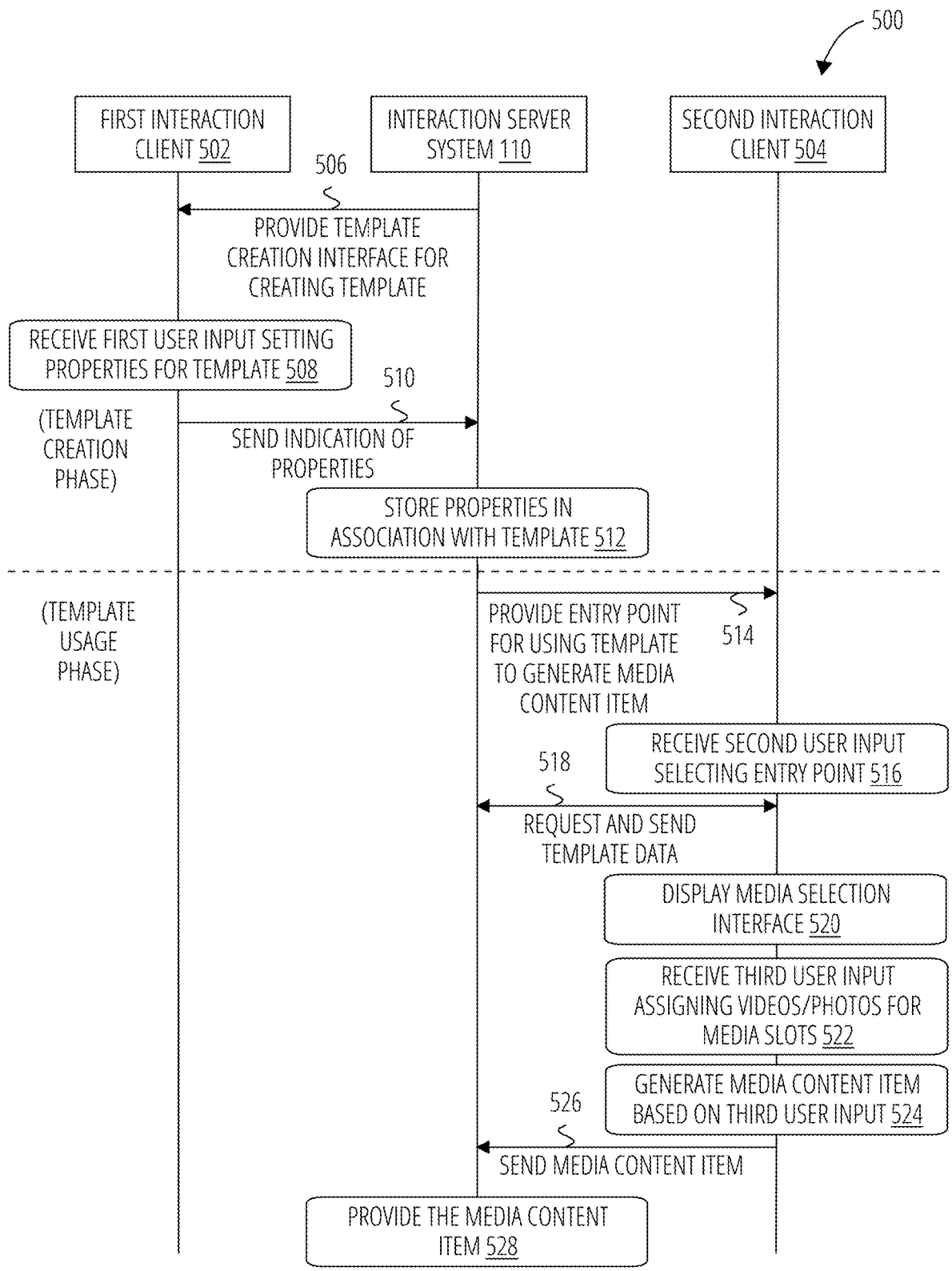
FIG. 5 is an interaction diagram illustrating a process for providing a template for media content generation, in accordance with some examples.

FIG. 5 is an interaction diagram illustrating a process 500 for providing a template for media content generation, in accordance with some examples. For explanatory purposes, the process 500 is primarily described herein with reference to the interaction client 104 (e.g., corresponding to the first interaction client 502 and the second interaction client 504) and to the interaction server system 110 of FIG. 1. However, one or more blocks (or operations) of the process 500 may be performed by one or more other components, and/or by other suitable devices. Further for explanatory purposes, the blocks (or operations) of the process 500 are described herein as occurring in serial, or linearly. However, multiple blocks (or operations) of the process 500 may occur in parallel or concurrently. In addition, the blocks (or operations) of the process 500 need not be performed in the order shown and/or one or more blocks (or operations) of the process 500 need not be performed and/or can be replaced by other operations. The process 500 may be terminated when its operations are completed. In addition, the process 500 may correspond to a method, a procedure, an algorithm, etc.

In example embodiments, each of the first interaction client 502 and the second interaction client 504 correspond to respective instances of the interaction client 104, with the first interaction client 502 running on a first device (e.g., a first user system 102) and the second interaction client 504 running on a second device (e.g., a second user system 102). The first interaction client 502 is associated with a respective first user, and the second interaction client 504 is associated with a respective second user of the interaction system 100. For example, the first user is associated with a respective first user account of the interaction server system 110, and the second user is associated with a respective second user account of the interaction server system 110. As noted above, the first and second users are identified by the interaction server system 110 based on unique identifiers (e.g., a messaging system identifier, email address and/or a device identifier) associated with the respective user accounts for the first and second users.

As described herein, the template system 230 as implemented by the interaction system 100 provides for a first user (e.g., a template creator) to create a template for combining an audio track with media content that is subsequently selected by a second user (e.g., an end user). The first user specifies the audio track, defines media slots for subsequent user selection of videos/photos to accompany the audio track, and defines edits (e.g., captions, stickers, augmented reality content items) that are applied to the subsequently-selected videos/photos.

The template system 230 makes the template available to end users. When the second user selects to use the template, the template system 230 provides a user interface to the second user, for selecting the videos/photos for assigning to the media slots, and for selecting any additional edits (e.g., if permitted by the template). The template system 230 generates the media content item based on the properties and edits of the template, as well as on the selections by the second user.

In the example of FIG. 5, operations 506-512 correspond to a first phase (e.g., a "template creation phase") and operations 514-528 correspond to a second phase (e.g., a "template usage phase"). During the template creation phase, the first user provides input for setting properties (e.g., defining the media slots) for a template. Each media slot is assignable to a respective video or photo, with such assignments being made during the template usage phase. During the template usage phase, the template is presented together with other available templates to the second user. The second user selects the created template, and then assigns a respective video/photo to each media slot, in order to generate a media content item. It may be understood that the second phase may occur shortly after the first phase, or after an extended period of time after the first phase. As such, FIG. 5 includes a dashed line separating the first phase and the second phase for illustrative purposes.

At operation 506, the interaction server system 110 provides, to the first interaction client 502, a template creation interface for creating a template. The template system 230 provides for the first user, such as an administrator of the interaction system 100 (e.g., an employee) or a general end user of the interaction system 100, to design and create templates.

The template creation interface corresponds to a user interface with interface elements to set the properties for the template. For example, the template creation interface includes interface elements for the first user to specify one or more of: a number of media slots; a sequence (e.g., order) for the media slots; a duration (e.g., in seconds) for each of the media slots; and edits (e.g., audio tracks, captions, stickers, augmented reality content items, and the like) for applying to each of the media slots.

At block 508, the first interaction client 502 receives first user input, via the template creation interface, setting the properties for the template. With respect to edits, the template creation interface includes an interface element for selecting one or more audio track(s) to accompany the subsequently-selected media content for the template. The audio track(s) correspond to prerecorded music, speech and/or other sounds that are user-selectable from a library of audio tracks. For example, the library of audio tracks is maintained by (e.g., with proper licensing agreements) the interaction system 100.

In example embodiments, the template system 230 may implement or otherwise access beat detection algorithm(s) configured to detect the beat of audio tracks corresponding to music. Based on the detected beats, the template system 230 is configured to determine available boundaries for the media slots. For example, a boundary corresponds to a transition between media slots, where the media assigned to one media slot stops and the media assigned to the next media slot starts. In example embodiments, each boundary made available by the template system 230 is synchronized to the beat of the audio track. In other words, the template creation interface provides predefined available positions for a media slot to "snap" to the beat of the audio track.

In addition, the template creation interface includes interface element(s) for the first user to specify the number of media slots, the sequence of the media slots, and the duration for each media slot. The duration of a particular media slot may be limited with respect to the above-noted available boundaries, such that the start and stop points for the media slot fall on an available boundary. In this manner, it is possible for the media slots to have different durations relative to one another while still being synchronized to the beat of the audio track.

Moreover, the template creation interface includes interface element(s) for the first user to select edits, in addition to the audio tracks. For example, the edits include captions, stickers or other types of overlays, together with their respective sizes and positions. In addition, the edits include augmented reality content items for applying to videos/photos subsequently assigned to media slots.

In example embodiments, the template system 230 provides interface elements for the first user to select whether a particular edit (e.g., audio track, caption, sticker, augmented reality content item, and the like) applies across the media slots as a whole (e.g., globally), or on a per-clip basis. In this manner, it is possible for similar edits, different edits, or a combination of similar and different edits to be applied with respect to the media slots.

At operation 510, the first interaction client 502 sends an indication of the properties (e.g., the template data) to the interaction server system 110. At block 512, the interaction server system 110 stores the properties in association with the template. For example, the interaction server system 110 provides for storing the properties for the template within the template table 316 of the database 128.

In example embodiments, the template is stored within the template table 316 as a data structure with the following data fields: attribution (e.g., for identifying the template and attribution to the original template); number of media slots; duration of media slots; whether each media slot is mutable/immutable (e.g., editable by the second user); global edits; edits on a per-clip basis; whether each edit is mutable/immutable; whether to save the template to "memories" (e.g., as a personal story"), and whether the template is editable from memories; transition effect(s) between clips (e.g., fade in, fade out, wash out, dissolve, jump cut, cutaway, iris in, iris out); transition effects with respect to captions; and/or other template-specific metadata.

As noted above, operations 514-528 relate to a template usage phase, during which the second user selects the created template (e.g., from among available templates), and assigns a respective video/photo to each media slot to generate a media content item.

At operation 514, the interaction server system 110 provides an entry point for the template to the second interaction client 504. The entry points allow the second user to select and use the template to generate a media content item.

For example, as discussed further below with respect to FIG. 6, a first entry point is selectable from a camera interface displayed on the second interaction client 504. The camera interface is configured to capture image data and to display the captured image data in real-time.

In example embodiments, the camera interface corresponds to a director mode for capturing the image data, where the director mode is accessible from a toolbar within an initial camera interface that is presented upon startup of the second interaction client 504. The director mode provides the second user with camera features (e.g., including the first entry point) for creating video content.

In example embodiments, the first entry point is a user-selectable button within the camera interface (e.g., director mode). User selection of the button redirects the second interaction client 504 to a template grid view (e.g., discussed below with respect to FIG. 8) which displays available templates for user selection. The available templates include the template created in the above-described template creation phase.

In example embodiments, the available templates are presented in ranked order, as based on one or more ranking factors, including but not limited to: overall template popularity; templates relevant to personal data such as content preferences (e.g., for music or other content), user interaction history, device geolocation and the like, where the personal data is accessed and used in accordance with proper user permissions; when the template was created; promotions associated with incentive programs implemented by the interaction system 100; and/or machine learning associated with one or more of the above-listed factors.

As discussed below with respect to FIG. 7, a second entry point to the created template is presented within a media content item displayed on the second interaction client 504. In example embodiments, the media content item was generated using the created template. Stated otherwise, a prior user (e.g., a contact, influencer or other user) used the template to create a media content item, which was subsequently viewed by the second user.

In example embodiments, the media content item may have been accessed and viewed through a content feed provided to the second interaction client 504. In this regard, the second interaction client 504 in conjunction with the interaction server system 110 is configured to provide different content feeds to the second user, with each content feed including multiple media content items that are viewable by the second user.

In example embodiments, the media content items for content feeds are presented in ranked order, based on one or more ranking factors, including but not limited to: overall popularity of media content items; media content items relevant to personal data such as content preferences (e.g., for music or other content), user interaction history, device geolocation and the like, where the personal data is accessed and used in accordance with proper user permissions; when the media content item was created; promotions associated with incentive programs implemented by the interaction system 100; and/or machine learning associated with one or more of the above-listed factors.

By way of non-limiting example, the content feeds offered by the interaction system 100 include but are not limited to a spotlight content feed, a contacts content feed, a subscription content feed and a suggested content feed. For example, the spotlight content feed includes media content items that are spotlighted (e.g., for being popular/viral, or that have the potential to be popular/viral) by the interaction system 100. The media content items may have been created and uploaded to the interaction system 100 by businesses, influencers and/or general users.

In example embodiments, the contacts content feed includes available content collections corresponding to contacts (e.g., friends) of the second user. Each content collection corresponds to a collection of media content items associated with the respective contact.

In example embodiments, the subscription content feed includes user-selectable content submitted by entities (e.g., influencers, businesses, and the like) to which the second user subscribes with respect to the interaction system 100. Moreover, the suggested content feed includes user-selectable content otherwise suggested to the second user (e.g., as determined by the interaction system 100).

In example embodiments, the second entry point is a user-selectable button (e.g., a "use template") within the media content item. User selection of the button redirects the second interaction client 504 to a template selection view (e.g., as discussed below with respect to FIG. 9A) in which the template is preselected for the second user. The template selection view allows the second user to scroll through other available templates, for example, in response to predefined a user gesture (e.g., a swipe gesture).

At block 516, the second interaction client 504 receives second user input selecting the entry point. For example, if the second user selected the first entry point, the second user may further select the created template from among the available template within the template grid view. The second interaction client 504 sends a request for the selected template (e.g., as stored per block 512) to the interaction server system 110. The interaction server system 110 causes the second interaction client 504 to display the template selection view (operation 518) in which the selected template is presented as the active template.

In another example, the second user selects the second entry point (e.g., the "use template" button included in the media content item). In response, the second interaction client 504 sends a request for the template (e.g., as stored per block 512) to the interaction server system 110. The interaction server system 110 causes the second interaction client 504 to display the template selection view (operation 518) in which the template is presented as the active template.

While the example of FIG. 5 describes the first entry point and the second entry point, the interaction system 100 is not limited to these entry points. Other entry points for accessing the using the template include, but are not limited to: a call to attention (or "CTA" for directing to a specific template or for directing to the template selection interface); an icon within a carousel interface of selectable augmented reality content items (e.g., lenses), where the icon is selectable to activate the created template; and/or a button (e.g., within a preview interface) for activating the created template based on post-capture video/photo. The other entry points may present the created template and/or available templates in ranked order as described above.

At block 520, the second interaction client 504 displays a media selection interface (e.g., as discussed further below with respect to FIGS. 10A-10B). The media selection interface includes a media slot for each of the media slots. In example embodiments, the media selection interface indicates the duration for each media slot. Each media slot is assignable to a respective video or photo that is selectable by the second user.

In example embodiments, the media selection interface provides for the second user to select the video/photo from a media library stored in association with the second user account (e.g., a personal story of the second user). Alternatively or in addition, the media library is stored locally on the user system 102 running the second interaction client 504. The selectable videos/photos may be presented as respective tiles in a grid, with each tile being selectable for assigning to the corresponding media slot.

The media selection interface is configured to gray out or otherwise prevent the second user from selecting a respective video which is shorter in length than the duration for a current media slot. Photos are not grayed out in this manner, since the interaction client 104 provides for the photo to be displayable for the entire duration for the current media slot.

In example embodiments, the media selection interface is further configured to include a user-selectable element (e.g., a separate button, or an additional tile) for redirecting to a capture interface. In the capture interface, the second interaction client 504 activates a device camera to capture the video or photo for assigning to the corresponding media slot. In a case where a video as opposed to a photo is captured, the second interaction client 504 is configured to display a countdown timer for the video based on the duration of media slot corresponding to the media slot.

In example embodiments, the second interaction client 504 provides for the second user to capture a single video or single photo to occupy the entire duration of the media slot. Alternatively or in addition, the second interaction client 504 provides for the second user to capture multiple videos/photos that when combined occupy the entire duration of the slot, where each video decrements the countdown timer based on its respective length and each photo decrements the counter for a preset time (e.g., 1 second).

Thus, at block 522, the second interaction client 504 receives third user input selecting a respective video and/or photo to assign to each of the media slots. As noted above, the first user may have specified edits (e.g., audio tracks, captions, stickers, augmented reality content items, and the like) for the media slots, at either a global level or a per-clip basis.

In example embodiments, the interaction system 100 provides for particular edits to be immutable. For example, the audio track(s) selected by the first user are immutable. In addition, the first user may preassign video/photo (e.g., with edits) to a media slot, and designate that media slot as immutable such that the second user cannot modify the preassigned video/photo. For the remaining media slots and/or edits that are not immutable, the second interaction client 504 provides the second user with interface elements for optionally modifying, removing and/or adding edits with respect to those remaining media slots.

In some cases, the respective video assigned to a current media slot may be longer than the duration for the media slot. Thus, the second interaction client 504 provides interface elements permitting the second user to select which segment (e.g., "trim segment") of the video is assigned to the media slot. For example, the second interaction client 504 provides a trim view with a selector for selecting the trim segment.

At block 524, the second interaction client 504 generates a media content item based on the template and on the second user input. Based on the sequence of media slots as defined by the template, the second interaction client 504 is configured to combine the respective videos and/or photos assigned to the media slots having specified durations together with the specified audio track(s) and any additional edits, to generate the media content item. As discussed further below with respect to FIG. 12, the second interaction client 504 generates the media content item in response to user input selecting an element (e.g., a check button) confirming that the media content item is complete.

In response to the second user selecting the check button, the second interaction client 504 is configured to preview and/or send the generated media content item. As discussed below with respect to FIG. 13, the preview interface may include one or more user-selectable elements (e.g., buttons) for: modifying/annotating (e.g., drawing on, adding text to, adding stickers to, cropping, and the like) the media content item; saving the media content item; publishing a Story based on the media content item; and/or sending a message including the media content item.

Thus, at operation 526, the second interaction client 504 sends the media content item to the interaction server system 110, together with the user request to save, publish or send the media content item as specified by the second user. At block 528, the interaction server system 110 provides the media content item. For example, the interaction server system 110 provides for saving, publishing and/or sending the media content item as specified by the second user.

Thus, the template system 230 as implemented by the interaction system 100 provides for a first user (e.g., a template creator such as an administrator or a general user) to create a template for combining a preset audio track media content that is subsequently selected by a second user (e.g., an end user). The first user specifies the preset audio track, defines media slots for subsequent user selection of videos/photos to accompany the audio track, and defines edits (e.g., captions, stickers, augmented reality content items) for applying to the subsequently-selected videos/photos.

The template system 230 makes the template available to end users. When the second user selects to use the template, the template system 230 provides a user interface to the second user, for selecting the videos/photos for assigning to the media slots, and for selecting any additional edits (e.g., if permitted by the template). The template system 230 generates the media content item based on the properties and edits of the template, as well as on the selections by the second user.

By virtue of the foregoing, the interaction system 100 provides for increased user engagement with respect to generating and/or sharing media content items. For example, the interaction system 100 facilitates the creation of media content items by employing templates with preset audio track(s) and media slots to accompany the audio tracks. Thus, the interaction system 100 facilitates the creation of media content items for sharing between contacts, thereby saving time for end users, and reducing computational resources/processing power.

FIG. 6 illustrates a user interface 602 corresponding to a camera interface including a first entry point for a template, in accordance with some examples. For example, the user interface 602 corresponds to operation 514 of the template usage phase of FIG. 5. In the example of FIG. 6, the user interface 602 includes image data 604, camera tools 606, a template button 608, a shutter button 610 and a carousel interface launch button 612.

In example embodiments, the user interface 602 corresponds to a director mode for capturing the image data 604, where the director mode is accessible from a toolbar within an initial camera interface (not shown) that is presented upon startup of the second interaction client 504. The director mode provides the second user with a set of additional camera features (e.g., including the first entry point) for creating sophisticated video content relative to the initial camera interface.

The user interface 602 is configured to capture the image data 604 and to display the image data 604 in real-time. In example embodiments, the camera tools 606 include one or more of: a flip camera button for switching between front and rear facing cameras; a sounds button adding audio (e.g., licensed song clips, excerpts from TV and movies, own original audio); a dual camera button for capturing content using the front and back cameras at the same time; a lenses button for browsing augmented reality content items for applying to the captured image data; a green screen button for selecting a background; a speed button for changing the camera speed for the captured image data; a timer button to count down from a preset time before automatically taking a photo/video; a flash button for activating a flash of the camera; and an import media button for importing photos/video.

In example embodiments, the carousel interface launch button 612 is user-selectable to surface a carousel interface (not shown) for augmented reality content. The carousel interface allows first the user to cycle through and/or select different augmented reality content items, represented by respective icons, to apply with respect to the image data 604. Each augmented reality content item provides for adding a real-time special effect and/or sound to the image data 604.

In example embodiments, the shutter button 610 is user-selectable to take a picture (e.g., in response to a press/tap gesture) or to record a video (e.g., in response to a press-and-hold gesture) of the image data 604 captured by the camera. In a case where augmented reality content is selected (e.g., via the carousel interface), such augmented reality content is applied in real-time with respect to the image data 604.

In example embodiments, user selection of the template button 608 redirects the second interaction client 504 to a template grid view (e.g., discussed below with respect to FIG. 8) which displays available templates for user selection. The available templates include the template created in the above-described template creation phase. In example embodiments, the available templates are presented in ranked order as described above.

FIG. 7 illustrates a user interface 702 corresponding to a media content item including a second entry point for a template, in accordance with some examples. The user interface 702 displays a media content item 704 that was generated using a template. The media content item 704 may be accessible via a content feed.

In the example of FIG. 7, the content feed corresponds to a spotlight content feed. However, the content feed may correspond to a different content feed such as a contacts content feed, a subscription content feed or a suggested content feed.

The user interface 702 may include profile information 706 which is selectable to present a profile page of the creator of the media content item 704. In addition, the user interface 702 includes hashtags 708 to indicate types of content (e.g., metadata) related to the media content item 704.

Moreover, the user interface 702 includes context cards 712-714, for example, to indicate the edits associated with the template of the media content item 704. In the example of FIG. 7, the context card 712 indicates an audio track and the context card 714 indicates an augmented reality content item associated with the media content item 704.

The template button 710 (e.g., "use template") is user-selectable to redirect to the template selection view, as further discussed below with respect to FIG. 9A). As noted above, the template selection view allows the second user to scroll through other available templates, for example, in response to predefined a user gesture (e.g., a swipe gesture).

FIG. 8 illustrates a user interface 802 corresponding to a template grid view, in accordance with some examples. The user interface 802 includes thumbnails 804 and a close button 806.

As discussed above with respect to FIG. 5, the user interface 802 is surfaced in response to user selection of the first entry point (e.g., template button 608 of FIG. 6). The user interface 802 displays available templates for user selection within the thumbnails 804.

In example embodiments, the template grid view of FIG. 8 presents each available template as a respective thumbnail in a two-by-two layout. In example embodiments, each thumbnail within the thumbnails 804 includes a preview of the template (e.g., partial playback of a media content item previously generated using the template), a total time and number of clips for the template (e.g., "x seconds, y clips"), and/or the audio track (e.g., music title/artist) assigned to the template. Moreover, each thumbnail is selectable to redirect to the template selection view, with the selected template being presented as the active template.

In example embodiments, user selection of the close button 806 button closes the template grid view and redirects to the prior interface. For example, the prior interface corresponds to the director mode of a camera interface (e.g., per FIG. 6).

FIGS. 9A-9B illustrate a user interface 902 corresponding to a template selection view, in accordance with some examples. The user interface 902 includes an active template 904, media slots 906, a mute button 908, and a close button 910.

As noted above, the template selection view is surfaced in response to user selection of the second entry point (e.g., template button 710 of FIG. 7) or in response to user selection of a corresponding thumbnail within the thumbnails 804.

In example embodiments, the active template 904 displays a preview of the template. For example, the preview corresponds to playback (e.g., looping playback) of a media content item that was previously generated using the template. In the example of FIG. 9A, the previously-generated media content item includes contextual cards showing the edits (e.g., augmented reality content item) and/or audio track (e.g., song) used in that template.

The mute button 908 is user-selectable to mute and unmute the sound with respect to the preview for the active template 904. In example embodiments, the mute button 908 on the top right is hidden by default, and only when a user mutes volume through hardware or by tapping on the card active template 904 is the mute button 908 shown indicating that sound is turned off.

In example embodiments, the media slots 906 for the active template 904 are presented in a dock view. The media slots 906 may default to all empty slots, or a combination of empty slots and prefilled slots (e.g., immutable slots as specified by the creator of the template). Each of the media slots 906 is presented with a respective duration for that media slot (e.g., in seconds). As discussed further below with respect to FIGS. 10A-10B, the media slot becomes filled after being assigned to a respective video/photo selected by the user.

In addition, the user interface 902 provides for the user to select among different templates, with the active template 904 corresponding to the currently-selected template. As shown in the example of FIG. 9A, the active template 904 is displayed at a horizontally-centered position of a rotatable carousel of templates. A user rotates through carousel by performing a predefined gesture (e.g., a swipe gesture) applied to the display screen, in either the left or the right direction. The carousel is rotated so as to place a different template in the horizontally-centered position, thereby causing the different template to become the active template 904.

FIG. 9B illustrates an example scenario in which a user performs the predefined gesture to rotate the carousel after having added at least one video/photo to the media slots 906. In response, the user interface 902 is configured to prompt the user (e.g., via a notification 912) to save a draft (e.g., via user selection of the save button 914) of the media content item before switching to a different template.

Figures 10A, 10B:
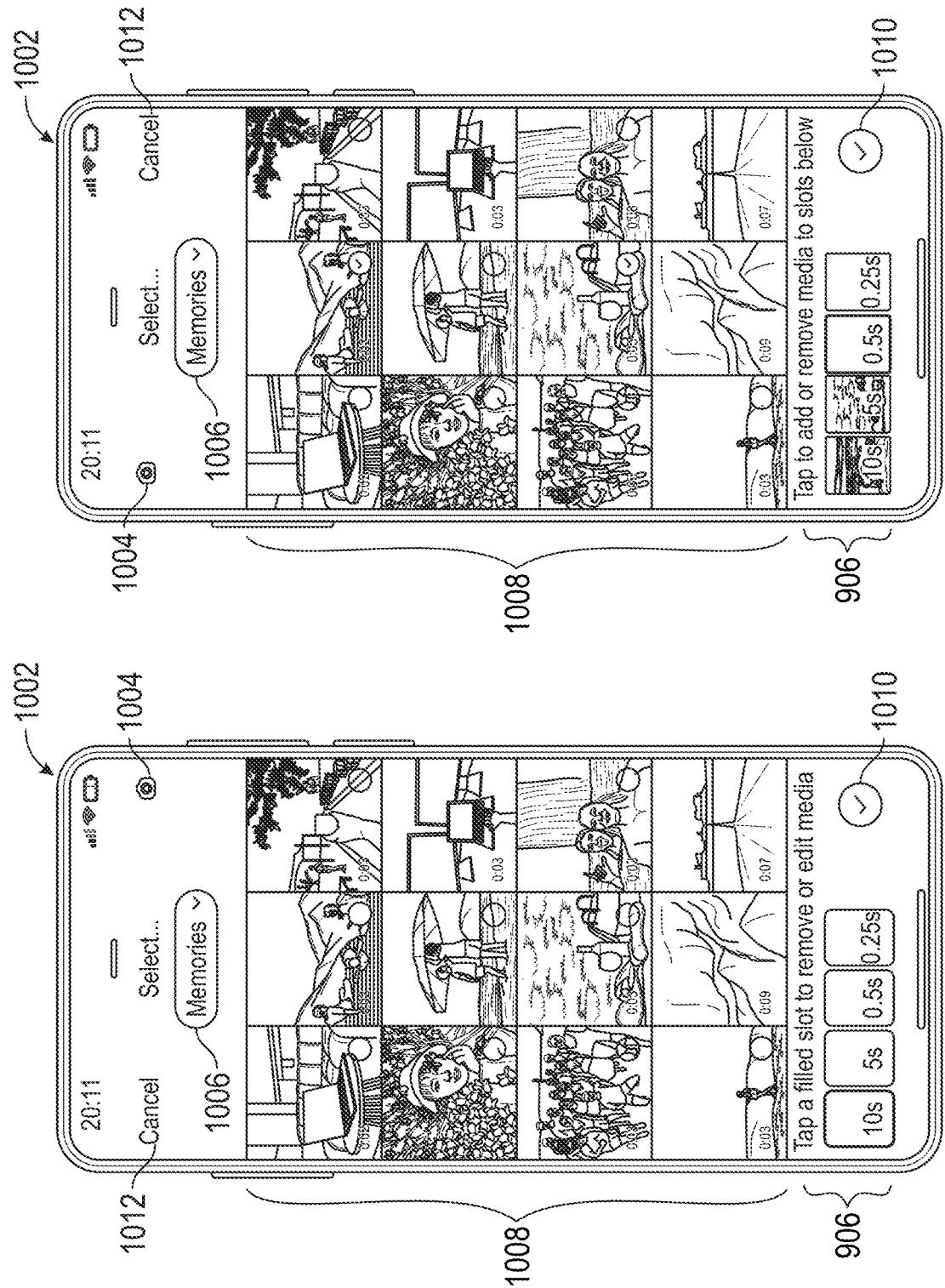
FIGS. 10A-10B illustrate a user interface corresponding to a media selection interface, in accordance with some examples.

FIGS. 10A-10B illustrate a user interface 1002 corresponding to a media selection interface, in accordance with some examples. The user interface 1002 includes a camera button 1004, a media library selector 1006, a media selector 1008, media slots 906, a preview button 1010 and a cancel button 1012.

The user interface 1002 includes respective media slots 906 for each of the media slots for the template. Each media slot indicates the duration (e.g., in seconds) of the respective media slot. Moreover, each media slot is assignable to a respective video or photo that is selectable by the user.

As noted above, the media slots 906 were initially displayed within a template selection view (e.g., see FIG. 9A) for a particular template. In response to user selection of a media slot, the interaction client 104 switches from the user interface 902 of FIG. 9A to the user interface 1002 of FIG. 10A.

The example of FIG. 10A illustrates the first (e.g., leftmost) media slot with a highlighted (e.g., yellow) frame. For example, the first media slot may automatically be highlighted when switching from the template selection view to the user interface 1002. The highlighted media slot corresponds to the current media slot for user selection of a corresponding video/photo. When a media slot is assigned to a video/photo, the highlight moves to the next (e.g., subsequent right) media slot in the sequence of media slots 906 (e.g., as shown in FIG. 10B). Moreover, user selection of a particular media slot within the media slots 906 causes the highlight to move to the user-selected media slot (e.g., to skip slots).

Thus, for each media slot, the user interface 1002 provides for a user (e.g., the second user of FIG. 5) to select a video/photo from the media selector 1008. The media selector 1008 is populated with videos/photos from one or more media libraries. For example, a first media library corresponds to the personal stories (e.g., "memories") stored by the interaction system 100 in association with the personal account of the user. A second media library is stored locally on the user system 102 running the interaction client 104. In this regard, the media library selector 1006 is usable to select between the first media library (e.g., "memories" as shown in FIG. 10A) and the second media library with locally-saved videos/photos. The first media library may be the default selection for the media library selector 1006.

As shown in the example of FIG. 10A, the media selector 1008 presents the videos/photos within the media selector 1008 as respective tiles in a grid. Each tile within the media selector 1008 is user-selectable for assigning to a corresponding (e.g., highlighted) media slot in the media slots 906. In example embodiments, each tile is presented with an empty checkbox (e.g., circle) which becomes filled (e.g., with a checkmark) upon user selection.

In example embodiments, the interaction client 104 allows the user to select multiple tiles at a time. In such cases, the interaction client 104 provides for the user interface 1002 to assign each selected video/photo to a respective and unfilled media slot within the media slots 906. While the example of FIG. 10B illustrates multiple checkmarks, the interaction client 104 may instead depict a numbered sequence (e.g., 1, 2, 3, etc.) to indicate the order in which remaining empty media slots are filled.

In example embodiments, the interaction client 104 is configured to determine which videos are shorter in length than the duration of the current (e.g., highlighted) media slot, and to prevent the user from selecting such videos. For example, the shorter videos are grayed out and/or presented with a caption (e.g., "too short") indicating that they are not selectable. Selection of photos is not prevented in this manner, since the photo is displayable for the entire duration of a respective media slot.

In example embodiments, the interaction client 104 provides for the user to select an already-filled media slot within the media slots 906. In response to such selection, the user interface 1002 provides for the user to select a different video/photo from the media selector 1008 for the media slot, to remove the currently-assigned video/photo for the media slot, and/or to redirect to a trim view for selecting a segment of the currently-assigned video/photo (e.g., as discussed further below with respect to FIG. 11). In a case where a video/photo is removed for an already-filled media slot, the media slot becomes unfilled while maintaining a highlighted frame, and the remaining media slots within the media slots 906 are unaffected.

In example embodiments, the user interface 1002 includes the camera button 1004, for redirecting to a capture interface (e.g., discussed below with respect to FIG. 12). The capture interface activates a device camera to capture the video or photo for assigning to the corresponding media slot. In a case where a video as opposed to a photo is captured, the interaction client 104 is configured to display a countdown timer for the video based on the duration of the highlighted media slot (e.g., as discussed further below with respect to FIG. 12). After capturing the video/photo, the interaction client 104 returns to the user interface 1002.

In example embodiments, the user interface 1002 enables a preview button 1010 once all of the media slots within the media slots 906 have been filled. For example, the preview button 1010 may be grayed out and disabled while the user is selecting a respective video/photo for each of the media slots 906. However, upon assigning a video/photo for all of the media slots 906, the interaction client 104 is configured to enable the preview button 1010, and to display the preview button 1010 as enabled for selection (e.g., by displaying the preview button 1010 as yellow instead of gray).

In example embodiments, the cancel button 1012 is user-selectable to return to the template selection view (e.g., of FIG. 9A). As noted above, if the user selects to switch to another template via a swipe gesture within the template selection view, the user is prompted to save a draft of the media content item (e.g., per FIG. 9B).

While the example of FIGS. 10A-10B illustrate that the media slots 906 initially default to all being empty (e.g., unassigned), it is possible for the interaction client 104 in conjunction with the interaction server system 110 to automatically all or some of the media slots 906 with video(s) and/or photo(s) selected from a media library associated with the user. With proper user permissions, the interaction server system 110 may be configured to preselect videos/photos from the media library based on context of the videos/photos (e.g., geolocation, object detection, tagged content, metadata and the like) that matches context of the template (e.g., music, location, age, and the like). In this manner, the interaction client 104 is able to provide a "draft" media content item with selected videos/photos for the user to review, approve and/or otherwise modify to generate the corresponding media content item.

Figure 11:
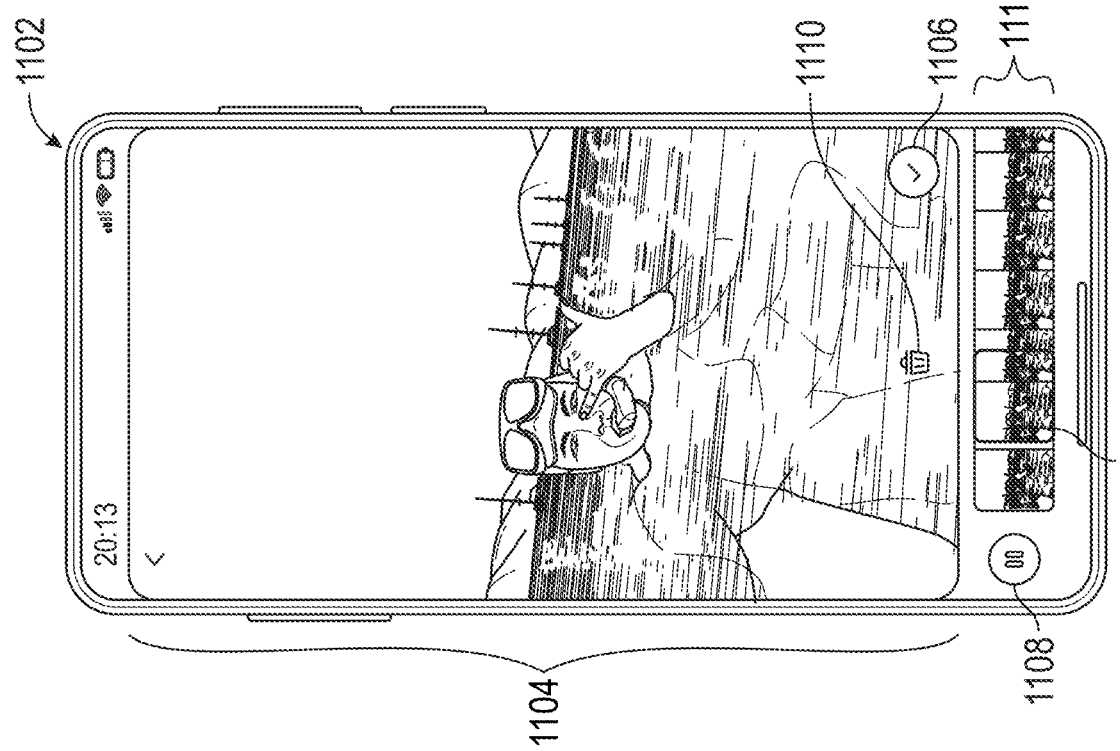
FIG. 11 illustrates a user interface corresponding to a trim view, in accordance with some examples.

FIG. 11 illustrates a user interface 1102 corresponding to a trim view, in accordance with some examples. As noted above, the trim view provides for the user to select a segment for a currently-assigned video/photo. In the example of FIG. 11, the user interface 1102 includes image data 1104, a save button 1106, a pause button 1108, a delete button 1110, a preview bar 1112, and a segment selector 1114.

In example embodiments, in response to user selection of a media slot with a video assigned thereto, the interaction client 104 is configured to determine if the assigned video has a longer duration than the duration of the selected media slot. If the assigned video has a longer duration, the interaction client 104 provides for displaying the user interface 1102 corresponding to the trim view.

The user interface 1102 allows the user to select a segment of the video for assigning to the media slot, where the selected segment is set to have the duration corresponding to the media slot. In example embodiments, the interaction client 104 does not allow the user to change the duration of the media slot. Initially, the interaction client 104 defaults to an initial segment (e.g., starting from the beginning of the video and having the duration of the media slot).

The user interface 1102 further includes the preview bar 1112 which presents frames of the respective video. The segment selector 1114 is a user-draggable selector having a width corresponding to the duration of the media slot, for selection of the segment.

As the segment selector 1114 is dragged, the image data 1104 is updated to correspond to the selected segment. In example embodiments, the image data 1104 is displayed as a looped playback of the selected segment within the user interface 1102, to the segment of the video that will be used for the respective media slot.

In example embodiments, the pause button 1108 is user-selectable to pause and un-pause the playback (e.g., looped playback) of the selected segment. Moreover, the delete button 1110 is selectable to delete the video associated with the respective media slot. Selection of the delete button 1110 causes the interaction client 104 to redirect to the user interface 1002 of FIGS. 10A-10B, and to display the respective media slot as empty.

In example embodiments, the save button 1106 is user-selectable to save the segment, as set by the user via the segment selector 1114, for the respective media slot. Selection of the save button 1106 causes the interaction client 104 to redirect to the user interface 1002, and to display the respective media slot as filled (e.g., with a frame of the selected segment).

Figure 12:
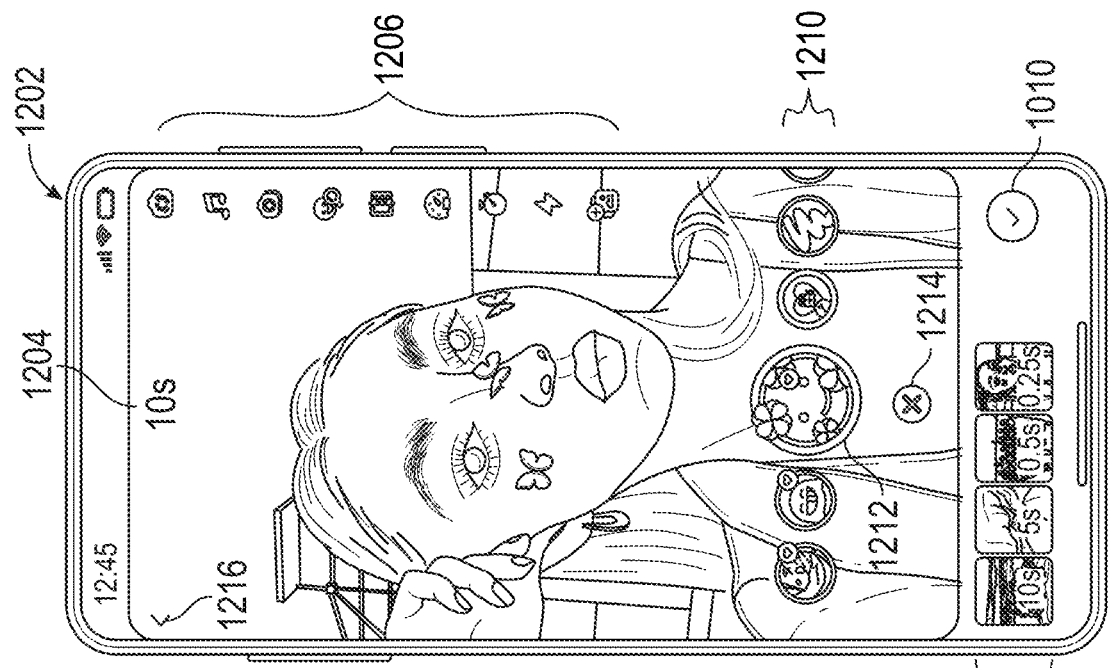
FIG. 12 illustrates a user interface corresponding to a capture interface, in accordance with some examples.

FIG. 12 illustrates a user interface 1202 corresponding to a capture interface, in accordance with some examples. The capture interface activates a device camera to capture a video or photo for assigning to a corresponding media slot. In the example of FIG. 12, the user interface 1202 includes a countdown timer 1204, camera tools 1206, image data 1208, a carousel interface 1210, a selected AR icon 1212, a delete button 1214, and a back button 1216. In addition, the user interface 1202 includes the media slots 906 and the preview button 1010 described above with respect to FIGS. 10A-10B.

As noted above with respect to FIGS. 10A-10B, the user interface 1202 is surfaced in response to user selection of the camera button 1004. The user interface 1202 displays the image data 1208 captured by the device camera (e.g., a front-facing camera, or a rear-facing camera) in real-time. Moreover, the camera tools 1206 include one or more of: a flip camera button for switching between front and rear facing cameras; a dual camera button for capturing content using the front and back cameras at the same time; a green screen button for selecting a background; a speed button for changing the camera speed for the captured image data; a timer button to count down from a preset time before automatically taking a photo/video; a flash button for activating a flash of the camera; and an import media button for importing photos/video.

In example embodiments, carousel interface 1210 allows the user to cycle through and/or select different augmented reality content items (e.g., Lenses) to apply/display with respect to the image data 1208. Each of the available augmented reality content items is represented by an icon which is user-selectable for switching to the respective augmented reality content item. In example embodiments, the icon corresponding to an active augmented reality content item (e.g., a selected AR icon 1212) is displayed in a different manner relative to (e.g., larger than) the remaining icons.

As noted above, during the template creation phase, the template creator may have specified edits, corresponding to augmented reality content items, for the media slots 906 at either a global level or a per-clip basis. In the example of FIG. 12, the selected AR icon 1212 corresponds an augmented reality content item that was preselected by the template creator during the template creation phase. In a case where the template creator (e.g., the first user in FIG. 5) had specified the augmented reality content item to be immutable, the end user (e.g., the second user in FIG. 5) would not be permitted to select a different augmented reality content item within the 1212. On the other hand, if the template creator (e.g., first user) permitted changes with respect to the augmented reality content item, the end user (e.g., second user) would be permitted to select a different augmented reality content item, or no augmented reality content item, via the selected AR icon 1212.

User selection of the selected AR icon 1212 provides for generating an image (e.g., in response to a press/tap gesture of the selected AR icon 1212) and/or a video (e.g., in response to a press-and-hold gesture of the selected AR icon 1212) of the screen content. While not shown in the example of FIG. 12, the selected AR icon 1212 can correspond to a blank button in which no augmented reality content item is selected, to capture a regular video/photo without applying augmented reality content to the image data 1208.

Moreover, during the template creation phase, the creator may have specified edits, corresponding to audio track(s), for the media slots 906 at either a global level or a per-clip basis. During capture of the image data 1208, the interaction client 104 is configured to play the audio track with a time offset that is based on the start of the corresponding media slot.

In example embodiments, the audio track(s) selected by the first user are immutable. As such, the user interface 1202 does not include an interface element (e.g., music scrubber) for editing audio associated with the video/photo corresponding to the image data 1208.

As noted above, in a case where a video as opposed to a photo is captured, the interaction client 104 is configured to display the countdown timer 1204 for the video based on the duration of the current media slot. For example, the countdown timer initially displays, in seconds, the duration of the respective media slot, and counts down in seconds as the press-and-hold gesture of the selected AR icon 1212 is held.

In example embodiments, the interaction client 104 provides for the user to capture a single video or single photo to occupy the entire duration of the current media slot.

Alternatively or in addition, the interaction client 104 provides for the user to capture multiple videos/photos that combine to occupy the entire duration of the current media slot. Each video for the current media slot decrements the countdown timer based on its respective length, and each photo for the media slot decrements the counter for a preset time (e.g., 1 second).

The interaction client 104 is configured to stop recording when the duration of the respective media slot is reached (e.g., 25 seconds as shown in the corresponding media slot of FIG. 12). In example embodiments, the delete button 1214 is user-selectable to delete the video(s) and/or photo(s) associated with the respective media slot. Selection of the delete button 1214 causes the interaction client 104 to display the respective media slot as empty and allows the user to re-record video/photo, via the user interface 1202, for the respective media slot. In addition, the back button 1216 is user-selectable to exit the capture interface and return to the media selection interface of FIGS. 10A-10B while retaining the captured image data 1208 with respect to the respective media slot (e.g., based on a user prompt).

As noted above, in a case where the media slots 906 are not yet filled, the interaction client 104 provides for highlighting the next available media slot. The user can then select to fill the next available media slot with a video/photo selected from the media selection interface per FIGS. 10A-10B, or with newly-captured video(s)/photo(s) via the capture interface per FIG. 12.

FIG. 12 depicts an example scenario in which the media slots 906 are filled. The user interface 1002 enables the preview button 1010 (e.g., by changing of color of the preview button 1010 from gray to yellow). The preview button 1010 is user-selectable to generate a media content item based on the videos and/or photos assigned to the media slots 906. In addition, the interaction client 104 redirects to the preview interface as discussed below with respect to FIG. 13.

Figure 13:
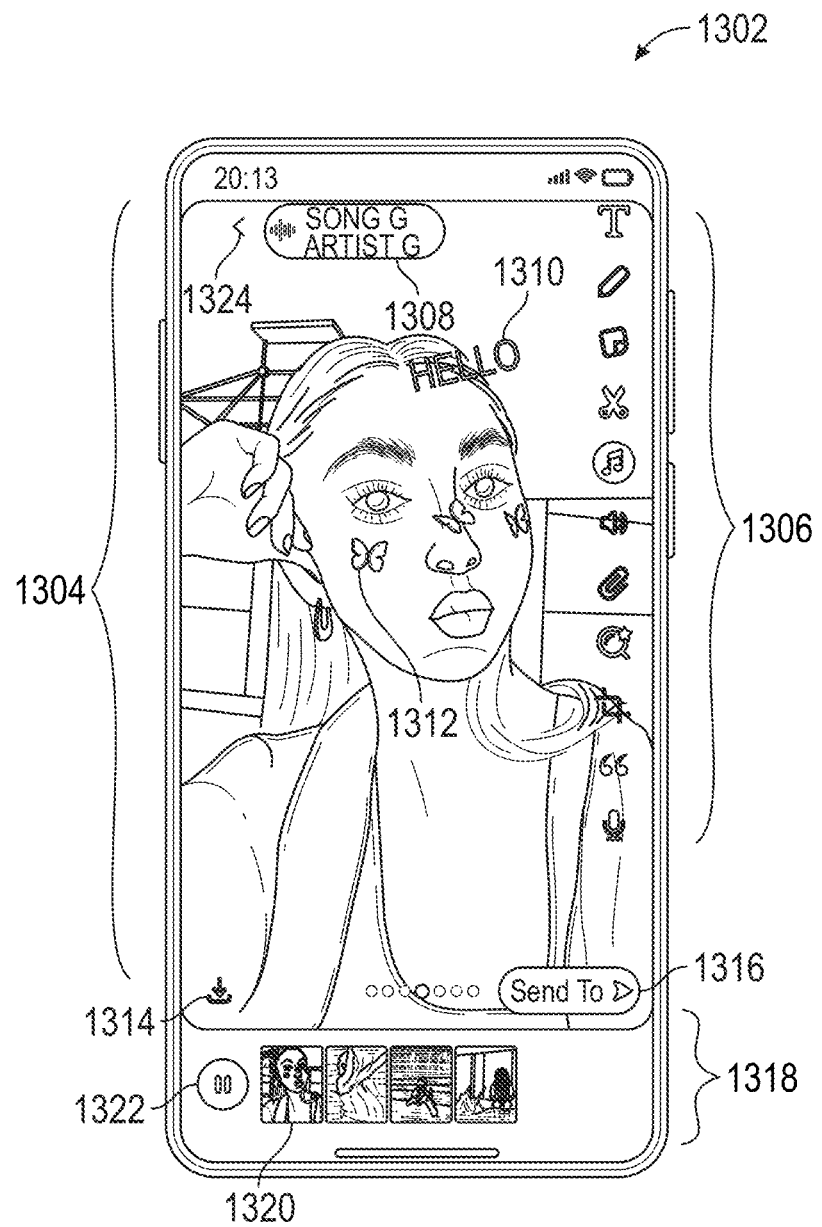
FIG. 13 illustrates a user interface corresponding to a preview interface, in accordance with some examples.

FIG. 13 illustrates a user interface 1302 corresponding to a preview interface, in accordance with some examples. The interaction client 104 is configured to combine the respective videos and/or photos assigned to the media slots together with the specified audio track(s) and any additional edits, to generate the media content item. The user interface 1302 includes image data 1304, editing tools 1306, audio track information 1308, a caption 1310, stickers 1312, a save button 1314, a send button 1316, a position selector 1320 and a pause button 1322.

In example embodiments, the editing tools 1306 include one or more of: a text button for adding or editing caption(s) context; a doodle button for drawing on top of photos and videos; stickers button for adding stickers such as emojis, bitmojis, GIFs, and the like; a scissors button for creating custom stickers; a web attachments for adding a URL; a loop button for enabling or disabling looped playback of the media content item; a voice filters button for changing voice; and a filters button for adding/editing filter-based effects.

As noted above, during the template creation phase, the first user (e.g., template creator) may have specified edits (e.g., audio tracks, captions, stickers, augmented reality content items, and the like) for the media slots, at either a global level or a per-clip basis. In doing so, the template creator further specified which edits are global and/or which edits are immutable. In example embodiments, the interaction client 104 is configured to present the editing tools 1306 based on which edits are mutable/immutable. For example, the buttons of the editing tools 1306 are enabled/disabled based on whether their corresponding edits are mutable/ immutable.

In the example of FIG. 13, the audio track information 1308, caption 1310 and stickers 1312 correspond to pre-applied edits. As noted above, the audio track information 1308 and corresponding audio track may be immutable. However, the caption 1310 and stickers 1312 may be mutable by the end user (e.g., the second user) via one or more of the editing tools 1306.

In example embodiments, the user interface 1302 further includes preview bar 1318 which presents frames of the respective media content item. The position selector 1320 is a user-draggable selector positioning to a particular frame in the media content item. As the position selector 1320 is dragged, the image data 1304 is updated to correspond to the selected position.

In example embodiments, the image data 1304 is displayed as a looped playback of the media content item within the user interface 1302. Moreover, the pause button 1322 is user-selectable to pause and un-pause the playback (e.g., looped playback) of the selected segment.

As shown in the example of FIG. 13, the preview bar 1318 displays boundaries between respective media slots. Each media slot is user-selectable to apply edits (e.g., captions, stickers, augmented reality content items, and the like) in a post-capture manner, based on the mutable/immutable status for the corresponding clip as specified by the template creator.

With respect to augmented reality content items, the user interface 1302 may be updated to include a carousel interface (e.g., similar to the carousel interface 1210 of FIG. 12) in order to add post-capture augmented reality content at a global or per-clip basis, based on the mutability/immutability properties for the template.

In example embodiments, the back button 1324 is user-selectable to exit the preview interface and return to the media selection interface of FIGS. 10A-10B, while retaining the media content item and changes made to it by the user via the editing tools 1306.

The user interface 1302 further includes a save button 1314 for saving the media content item (e.g., with modifications/annotations). In addition, the send button 1316 is user-selectable for sending the media content item, including any modifications and/or annotations, to a recipient (e.g., a contact/friend), group and/or story (e.g., a personal story).

Figure 14:
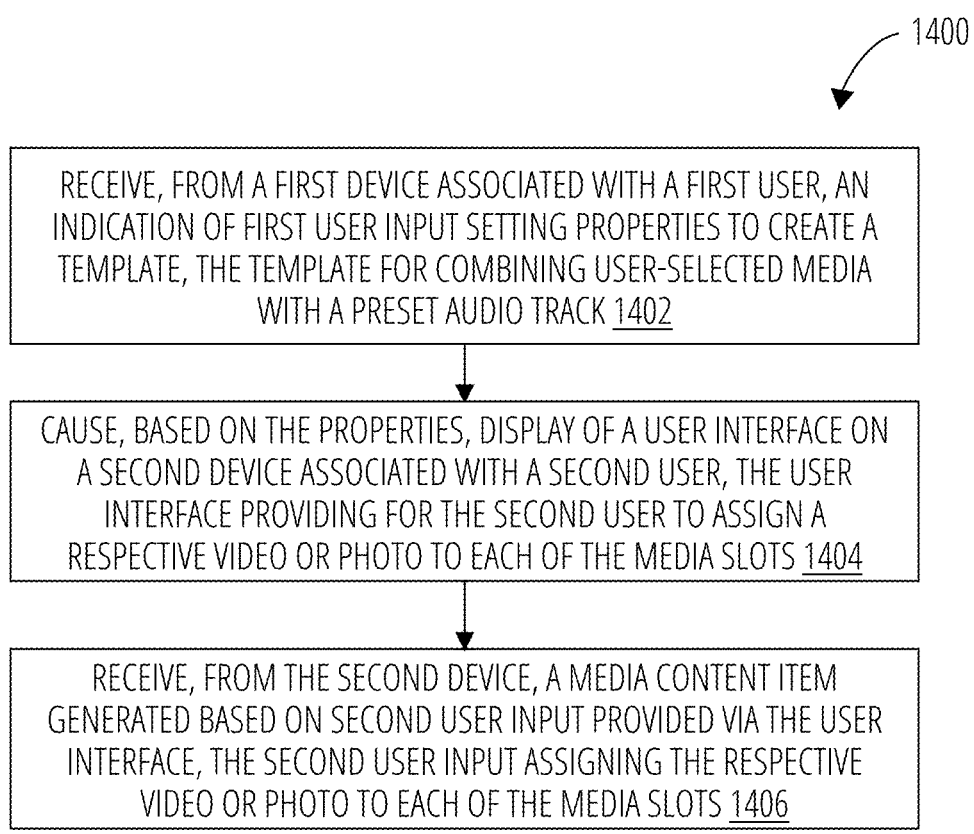
FIG. 14 is a flowchart illustrating a process for providing a template for media content generation, in accordance with some examples.

FIG. 14 is a flowchart illustrating a process 1400 for providing a template for media content generation, in accordance with some examples. For explanatory purposes, the process 1400 is primarily described herein with reference to the interaction server system 110, the first interaction client 502 and the second interaction client 504 of FIGS. 1 and 5. However, one or more blocks (or operations) of the process 1400 may be performed by one or more other components, and/or by other suitable devices. Further for explanatory purposes, the blocks (or operations) of the process 1400 are described herein as occurring in serial, or linearly. However, multiple blocks (or operations) of the process 1400 may occur in parallel or concurrently. In addition, the blocks (or operations) of the process 1400 need not be performed in the order shown and/or one or more blocks (or operations) of the process 1400 need not be performed and/or can be replaced by other operations. The process 1400 may be terminated when its operations are completed. In addition, the process 1400 may correspond to a method, a procedure, an algorithm, etc.

The interaction server system 110 receives, from the first interaction client 502 associated with a first user, an indication of first user input setting properties to create a template, the template for combining user-selected media with a preset audio track (block 1402). The properties specify the preset audio track, a sequence of media slots, a duration for each of the media slots, and predefined edits for applying in association with the media slots. In example embodiments, the predefined edits further include at least one of a caption, a sticker, or an augmented reality content item. The interaction server system 110 stores the properties in association with the template.

The interaction server system 110 causes, based on the properties, display of a user interface on a second interaction client 504 associated with a second user (block 1404). The user interface provides for the second user to assign a respective video or photo to each of the media slots. The first user and the second user may correspond to the same user or to different users.

In example embodiments, the interaction server system 110 provides, prior to causing display of the user interface, display of plural entry points on the second interaction client 504, each entry point of the plural entry points being selectable by the second user to surface the user interface. The plural entry points include a first entry point which is selectable from a camera interface displayed on the second interaction client 504, the camera interface being configured to capture image data and to display the captured image data in real-time. The plural entry points further include a second entry point selectable within a second media content item displayed on the second interaction client 504, the second media content item having been accessed through a content feed provided to the second interaction client 504.

In example embodiments, the user interface comprises a media selection element for selecting, from a media library, respective videos or photos for assigning to the media slots.

In addition, the user interface comprises a user-selectable button for activating a device camera for real-time capture of respective videos or photos for assigning to the media slots. The real-time capture of the respective videos is accompanied by display of respective countdown timers based on the durations of the media slots. The user interface is configured to receive third user input to select segments of the respective videos assigned to the media slots, the selected segments corresponding to the respective durations of the media slots.

The interaction server system 110 receives, from the second interaction client 504, a media content item generated based on second user input provided via the user interface (block 1406). The second user input assigns the respective video or photo to each of the media slots.

Machine Architecture

Figure 15:
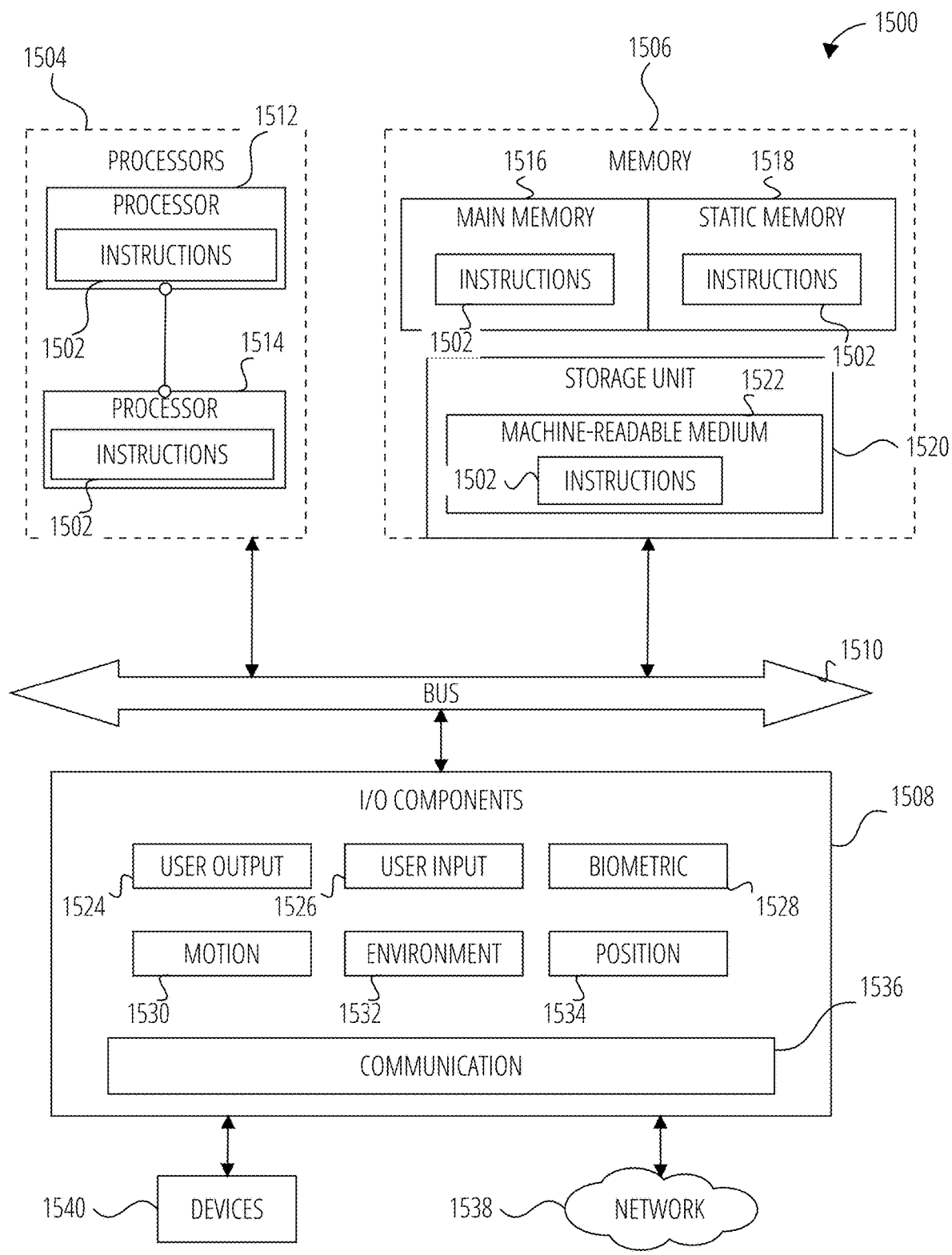
FIG. 15 is a diagrammatic representation of a machine in the form of a computer system within which a set of instructions may be executed to cause the machine to perform any one or more of the methodologies discussed herein, according to some examples.

FIG. 15 is a diagrammatic representation of the machine 1500 within which instructions 1502 (e.g., software, a program, an application, an applet, an app, or other executable code) for causing the machine 1500 to perform any one or more of the methodologies discussed herein may be executed. For example, the instructions 1502 may cause the machine 1500 to execute any one or more of the methods described herein. The instructions 1502 transform the general, non-programmed machine 1500 into a particular machine 1500 programmed to carry out the described and illustrated functions in the manner described. The machine 1500 may operate as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1502, sequentially or otherwise, that specify actions to be taken by the machine 1500. Further, while a single machine 1500 is illustrated, the term "machine" shall also be taken to include a collection of machines that individually or jointly execute the instructions 1502 to perform any one or more of the methodologies discussed herein. The machine 1500, for example, may comprise the user system 102 or any one of multiple server devices forming part of the interaction server system 110. In some examples, the machine 1500 may also comprise both client and server systems, with certain operations of a particular method or algorithm being performed on the server-side and with certain operations of the particular method or algorithm being performed on the client-side.

The machine 1500 may include processors 1504, memory 1506, and input/output I/O components 1508, which may be configured to communicate with each other via a bus 1510. In an example, the processors 1504 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1512 and a processor 1514 that execute the instructions 1502. The term "processor" is intended to include multi-core processors that may comprise two or more independent processors (sometimes referred to as "cores") that may execute instructions contemporaneously. Although FIG. 15 shows multiple processors 1504, the machine 1500 may include a single processor with a single-core, a single processor with multiple cores (e.g., a multi-core processor), multiple processors with a single core, multiple processors with multiples cores, or any combination thereof.

The memory 1506 includes a main memory 1516, a static memory 1518, and a storage unit 1520, both accessible to the processors 1504 via the bus 1510. The main memory 1506, the static memory 1518, and storage unit 1520 store the instructions 1502 embodying any one or more of the methodologies or functions described herein. The instructions 1502 may also reside, completely or partially, within the main memory 1516, within the static memory 1518, within machine-readable medium 1522 within the storage unit 1520, within at least one of the processors 1504 (e.g., within the processor's cache memory), or any suitable combination thereof, during execution thereof by the machine 1500.

The I/O components 1508 may include a wide variety of components to receive input, provide output, produce output, transmit information, exchange information, capture measurements, and so on. The specific I/O components 1508 that are included in a particular machine will depend on the type of machine. For example, portable machines such as mobile phones may include a touch input device or other such input mechanisms, while a headless server machine will likely not include such a touch input device. It will be appreciated that the I/O components 1508 may include many other components that are not shown in FIG. 15. In various examples, the I/O components 1508 may include user output components 1524 and user input components 1526. The user output components 1524 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1526 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1508 may include biometric components 1528, motion components 1530, environmental components 1532, or position components 1534, among a wide array of other components. For example, the biometric components 1528 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies, including:
Electroencephalography (EEG) based BMIs, which record electrical activity in the brain using electrodes placed on the scalp.
Invasive BMIs, which used electrodes that are surgically implanted into the brain.
Optogenetics BMIs, which use light to control the activity of specific nerve cells in the brain.

Any biometric data collected by the biometric components is captured and stored only with user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the data is not shared or sold to any third party without the explicit consent of the user. In addition, appropriate technical and organizational measures are implemented to ensure the security and confidentiality of this sensitive information.

The motion components 1530 include acceleration sensor components (e.g., accelerometer), gravitation sensor components, rotation sensor components (e.g., gyroscope).

The environmental components 1532 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gasses for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1534 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1508 further include communication components 1536 operable to couple the machine 1500 to a network 1538 or devices 1540 via respective coupling or connections. For example, the communication components 1536 may include a network interface component or another suitable device to interface with the network 1538. In further examples, the communication components 1536 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1540 may be another machine or any of a wide variety of peripheral devices (e.g., a peripheral device coupled via a USB).

Moreover, the communication components 1536 may detect identifiers or include components operable to detect identifiers. For example, the communication components 1536 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1536, such as location via Internet Protocol (IP) geolocation, location via Wi-Fi® signal triangulation, location via detecting an NFC beacon signal that may indicate a particular location, and so forth.

The various memories (e.g., main memory 1516, static memory 1518, and memory of the processors 1504) and storage unit 1520 may store one or more sets of instructions and data structures (e.g., software) embodying or used by any one or more of the methodologies or functions described herein. These instructions (e.g., the instructions 1502), when executed by processors 1504, cause various operations to implement the disclosed examples.

The instructions 1502 may be transmitted or received over the network 1538, using a transmission medium, via a network interface device (e.g., a network interface component included in the communication components 1536) and using any one of several well-known transfer protocols (e.g., hypertext transfer protocol (HTTP)). Similarly, the instructions 1502 may be transmitted or received using a transmission medium via a coupling (e.g., a peer-to-peer coupling) to the devices 1540.

Software Architecture

Figure 16:
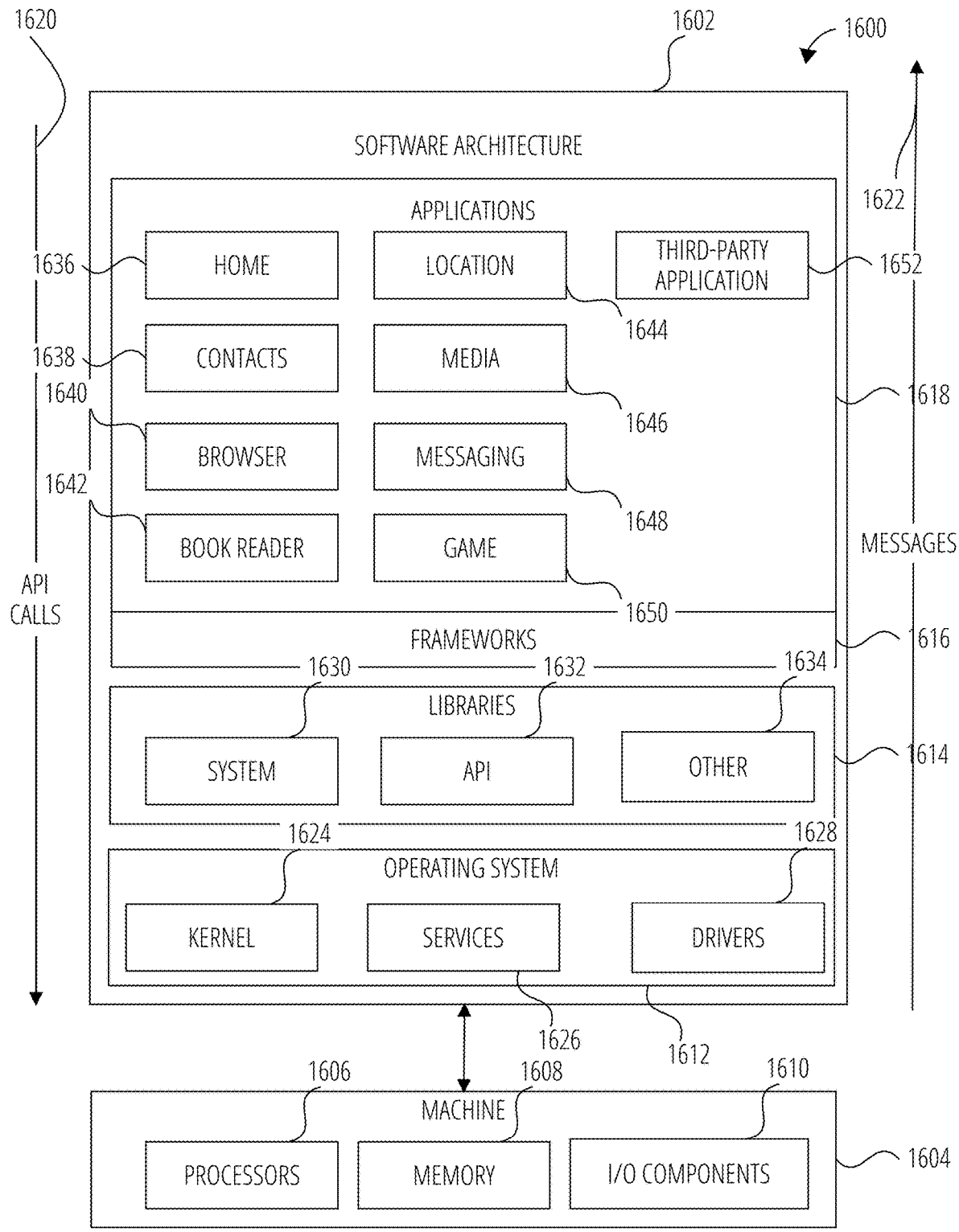
FIG. 16 is a block diagram showing a software architecture within which examples may be implemented.

FIG. 16 is a block diagram 1600 illustrating a software architecture 1602, which can be installed on any one or more of the devices described herein. The software architecture 1602 is supported by hardware such as a machine 1604 that includes processors 1606, memory 1608, and I/O components 1610. In this example, the software architecture 1602 can be conceptualized as a stack of layers, where each layer provides a particular functionality. The software architecture 1602 includes layers such as an operating system 1612, libraries 1614, frameworks 1616, and applications 1618. Operationally, the applications 1618 invoke API calls 1620 through the software stack and receive messages 1622 in response to the API calls 1620.

The operating system 1612 manages hardware resources and provides common services. The operating system 1612 includes, for example, a kernel 1624, services 1626, and drivers 1628. The kernel 1624 acts as an abstraction layer between the hardware and the other software layers. For example, the kernel 1624 provides memory management, processor management (e.g., scheduling), component management, networking, and security settings, among other functionalities. The services 1626 can provide other common services for the other software layers. The drivers 1628 are responsible for controlling or interfacing with the underlying hardware. For instance, the drivers 1628 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1614 provide a common low-level infrastructure used by the applications 1618. The libraries 1614 can include system libraries 1630 (e.g., C standard library) that provide functions such as memory allocation functions, string manipulation functions, mathematic functions, and the like. In addition, the libraries 1614 can include API libraries 1632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1614 can also include a wide variety of other libraries 1634 to provide many other APIs to the applications 1618.

The frameworks 1616 provide a common high-level infrastructure that is used by the applications 1618. For example, the frameworks 1616 provide various graphical user interface (GUI) functions, high-level resource management, and high-level location services. The frameworks 1616 can provide a broad spectrum of other APIs that can be used by the applications 1618, some of which may be specific to a particular operating system or platform.

In an example, the applications 1618 may include a home application 1636, a contacts application 1638, a browser application 1640, a book reader application 1642, a location application 1644, a media application 1646, a messaging application 1648, a game application 1650, and a broad assortment of other applications such as a third-party application 1652. The applications 1618 are programs that execute functions defined in the programs. Various programming languages can be employed to create one or more of the applications 1618, structured in a variety of manners, such as object-oriented programming languages (e.g., Objective-C, Java, or C++) or procedural programming languages (e.g., C or assembly language). In a specific example, the third-party application 1652 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1652 can invoke the API calls 1620 provided by the operating system 1612 to facilitate functionalities described herein.

Examples

Example 1 is a system comprising: at least one processor; at least one memory component storing instructions that, when executed by the at least one processor, cause the at least one processor to perform operations comprising: receiving, from a first device associated with a first user, an indication of first user input setting properties to create a template, the template for combining user-selected media with a preset audio track, wherein the properties specify the preset audio track, a sequence of media slots, a duration for each of the media slots, and predefined edits for applying in association with the media slots; causing, based on the properties, display of a user interface on a second device associated with a second user, the user interface providing for the second user to assign a respective video or photo to each of the media slots; and receiving, from the second device, a media content item generated based on second user input provided via the user interface, the second user input assigning the respective video or photo to each of the media slots.

In Example 2, the subject matter of Example 1 includes, the operations further comprising: providing, prior to causing display of the user interface, display of plural entry points on the second device, each entry point of the plural entry points being selectable by the second user to surface the user interface.

In Example 3, the subject matter of Example 2 includes, wherein the plural entry points comprise a first entry point which is selectable from a camera interface displayed on the second device, the camera interface being configured to capture image data and to display the captured image data in real-time.

In Example 4, the subject matter of Examples 2-3 includes, wherein the plural entry points comprise a second entry point selectable within a second media content item displayed on the second device, the second media content item having been accessed through a content feed provided to the second device.

In Example 5, the subject matter of Examples 1–4 includes, wherein the user interface comprises a media selection element for selecting, from a media library, respective videos or photos for assigning to the media slots.

In Example 6, the subject matter of Examples 1-5 includes, wherein the user interface comprises a user-selectable button for activating a device camera for real-time capture of respective videos or photos for assigning to the media slots.

In Example 7, the subject matter of Example 6 includes, wherein the real-time capture of the respective videos is accompanied by display of respective countdown timers based on the durations of the media slots.

In Example 8, the subject matter of Examples 1-7 includes, wherein the user interface is configured to receive third user input to select segments of the respective videos assigned to the media slots, the selected segments corresponding to the respective durations of the media slots.

In Example 9, the subject matter of Examples 1-8 includes, the operations further comprising: storing, prior to causing display of the user interface, the properties in association with the template.

In Example 10, the subject matter of Examples 1-9 includes, wherein the first user and the second user correspond to a same user.

In Example 11, the subject matter of Examples 1-10 includes, wherein the first user and the second user correspond to different users.

In Example 12, the subject matter of Examples 1-11 includes, wherein the predefined edits further include at least one of a caption, a sticker, or an augmented reality content item.

Example 13 is a method comprising: receiving, from a first device associated with a first user, an indication of first user input setting properties to create a template, the template for combining user-selected media with a preset audio track, wherein the properties specify the preset audio track, a sequence of media slots, a duration for each of the media slots, and predefined edits for applying in association with the media slots; causing, based on the properties, display of a user interface on a second device associated with a second user, the user interface providing for the second user to assign a respective video or photo to each of the media slots; and receiving, from the second device, a media content item generated based on second user input provided via the user interface, the second user input assigning the respective video or photo to each of the media slots.

In Example 14, the subject matter of Example 13 includes, providing, prior to causing display of the user interface, display of plural entry points on the second device, each entry point of the plural entry points being selectable by the second user to surface the user interface.

In Example 15, the subject matter of Example 14 includes, wherein the plural entry points comprise a first entry point which is selectable from a camera interface displayed on the second device, the camera interface being configured to capture image data and to display the captured image data in real-time.

In Example 16, the subject matter of Examples 14-15 includes, wherein the plural entry points comprise a second entry point selectable within a second media content item displayed on the second device, the second media content item having been accessed through a content feed provided to the second device.

In Example 17, the subject matter of Examples 13-16 includes, wherein the user interface comprises a media selection element for selecting, from a media library, respective videos or photos for assigning to the media slots.

In Example 18, the subject matter of Examples 13-17 includes, wherein the user interface comprises a user-selectable button for activating a device camera for real-time capture of respective videos or photos for assigning to the media slots.

In Example 19, the subject matter of Example 18 includes, wherein the real-time capture of the respective videos is accompanied by display of respective countdown timers based on the durations of the media slots.

Example 20 is a non-transitory computer-readable storage medium storing instructions that, when executed by at least one processor, cause the at least one processor to perform operations comprising: receiving, from a first device associated with a first user, an indication of first user input setting properties to create a template, the template for combining user-selected media with a preset audio track, wherein the properties specify the preset audio track, a sequence of media slots, a duration for each of the media slots, and predefined edits for applying in association with the media slots; causing, based on the properties, display of a user interface on a second device associated with a second user, the user interface providing for the second user to assign a respective video or photo to each of the media slots; and receiving, from the second device, a media content item generated based on second user input provided via the user interface, the second user input assigning the respective video or photo to each of the media slots.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action or interaction on the user device, including an interaction with other users or computer systems.

What is claimed is:

1. A system comprising:
   at least one processor;
   at least one memory component storing instructions that, when executed by the at least one processor, cause the at least one processor to perform operations comprising:
   receiving, from a first device associated with a first user, an indication of first user input setting properties to create a template, the template for combining user-selected media with a preset audio track, wherein the properties specify the preset audio track, a sequence of media slots, a duration for each of the media slots, and predefined edits for applying in association with the media slots;
   causing, based on the properties, display of a user interface on a second device associated with a second user, the user interface providing for the second user to assign a respective video or photo to each of the media slots;
   receiving, from the second device, a media content item generated based on second user input provided via the user interface, the second user input assigning the respective video or photo to each of the media slots; and
   providing, prior to causing display of the user interface, display of plural entry points on the second device, each entry point of the plural entry points being selectable by the second user to surface the user interface,
   wherein the plural entry points comprise a first entry point corresponding to a first button which is selectable from a camera interface, the camera interface providing for simultaneous display of real-time image data captured by the second device and the first button.

2. The system of claim 1, wherein the plural entry points comprise a second entry point corresponding to a second button which is selectable within a second media content item displayed on the second device, the second media content item having been accessed through a content feed provided to the second device.

3. The system of claim 1, wherein the user interface comprises a media selection element for selecting, from a media library, respective videos or photos for assigning to the media slots.

4. The system of claim 1, wherein the user interface comprises a user-selectable button for activating a device camera for real-time capture of respective videos or photos for assigning to the media slots.

5. The system of claim 4, wherein the real-time capture of the respective videos is accompanied by display of respective countdown timers based on the durations of the media slots.

6. The system of claim 1, wherein the user interface is configured to receive third user input to select segments of the respective videos assigned to the media slots, the selected segments corresponding to the respective durations of the media slots.

7. The system of claim 1, the operations further comprising:
storing, prior to causing display of the user interface, the properties in association with the template.

8. The system of claim 1, wherein the first user and the second user correspond to a same user.

9. The system of claim 1, wherein the first user and the second user correspond to different users.

10. The system of claim 1, wherein the predefined edits further include at least one of a caption, a sticker, or an augmented reality content item.

11. A method comprising:
receiving, from a first device associated with a first user, an indication of first user input setting properties to create a template, the template for combining user-selected media with a preset audio track, wherein the properties specify the preset audio track, a sequence of media slots, a duration for each of the media slots, and predefined edits for applying in association with the media slots;
causing, based on the properties, display of a user interface on a second device associated with a second user, the user interface providing for the second user to assign a respective video or photo to each of the media slots;
receiving, from the second device, a media content item generated based on second user input provided via the user interface, the second user input assigning the respective video or photo to each of the media slots; and
providing, prior to causing display of the user interface, display of plural entry points on the second device, each entry point of the plural entry points being selectable by the second user to surface the user interface, wherein the plural entry points comprise a first entry point corresponding to a first button which is selectable from a camera interface, the camera interface providing for simultaneous display of real-time image data captured by the second device and the first button.

12. The method of claim 11, wherein the plural entry points comprise a second entry point corresponding to a second button which is selectable within a second media content item displayed on the second device, the second media content item having been accessed through a content feed provided to the second device.

13. The method of claim 11, wherein the user interface comprises a media selection element for selecting, from a media library, respective videos or photos for assigning to the media slots.

14. The method of claim 11, wherein the user interface comprises a user-selectable button for activating a device camera for real-time capture of respective videos or photos for assigning to the media slots.

15. The method of claim 14, wherein the real-time capture of the respective videos is accompanied by display of respective countdown timers based on the durations of the media slots.

16. A non-transitory computer-readable storage medium storing instructions that, when executed by at least one processor, cause the at least one processor to perform operations comprising:
receiving, from a first device associated with a first user, an indication of first user input setting properties to create a template, the template for combining user-selected media with a preset audio track, wherein the properties specify the preset audio track, a sequence of media slots, a duration for each of the media slots, and predefined edits for applying in association with the media slots;
causing, based on the properties, display of a user interface on a second device associated with a second user, the user interface providing for the second user to assign a respective video or photo to each of the media slots;
receiving, from the second device, a media content item generated based on second user input provided via the user interface, the second user input assigning the respective video or photo to each of the media slots; and
providing, prior to causing display of the user interface, display of plural entry points on the second device, each entry point of the plural entry points being selectable by the second user to surface the user interface, wherein the plural entry points comprise a first entry point corresponding to a first button which is selectable from a camera interface, the camera interface providing for simultaneous display of real-time image data captured by the second device and the first button.

* * * * *